(12) United States Patent
Pauker et al.

(10) Patent No.: US 7,698,745 B2
(45) Date of Patent: Apr. 13, 2010

(54) SECURE MESSAGE SYSTEM WITH REMOTE DECRYPTION SERVICE

(75) Inventors: Matthew J. Pauker, San Francisco, CA (US); Rishi R. Kacker, Woodside, CA (US); Terence Spies, San Mateo, CA (US); Lucas C. Ryan, San Francisco, CA (US); Guido Appenzeller, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 477 days.

(21) Appl. No.: 11/888,290

(22) Filed: Jul. 30, 2007

(65) Prior Publication Data
US 2008/0049937 A1 Feb. 28, 2008

Related U.S. Application Data

(63) Continuation of application No. 10/744,851, filed on Dec. 22, 2003, now Pat. No. 7,266,847.

(60) Provisional application No. 60/505,954, filed on Sep. 25, 2003.

(51) Int. Cl.
*H04L 29/00* (2006.01)
(52) U.S. Cl. ........................... 726/27; 713/165
(58) Field of Classification Search ............ 726/27; 713/165; 380/270

See application file for complete search history.

(56) References Cited

U.S. PATENT DOCUMENTS 5,016,276 A 5/1991 Matumoto et al.
(Continued)

FOREIGN PATENT DOCUMENTS

WO    WO 02/51066 A1    6/2002
(Continued)

OTHER PUBLICATIONS

Feng Bao, "Introducing Decryption Authority into PKI," Computer Security Applications, 2000, ACSAC '00, 16th Annual Conference, IEEE Comput. Soc., ISBN: 978-0-7695-0859-7, Dec. 15, 2000, pp. 288-296, New Orleans, LA, USA.
(Continued)

*Primary Examiner*—Matthew B Smithers
(74) *Attorney, Agent, or Firm*—Treyz Law Group; G. Victor Treyz; David C. Kellogg

(57) ABSTRACT

Systems and methods for secure messaging are provided. A sender may encrypt content and send the encrypted content to a recipient over a communications network. The encrypted content may be decrypted for the recipient using a remote decryption service. Encrypted message content may be placed into a markup language form. Encrypted content may be incorporated into the form as a hidden form element. Form elements for collecting recipient credential information such as username and password information may also be incorporated into the form. At the recipient, the recipient may use the form to provide recipient credential information to the remote decryption service. The recipient may also use the form to upload the encrypted content from the form to the decryption service. The decryption service may provide the recipient with access to a decrypted version of the uploaded content over the communications network.

20 Claims, 15 Drawing Sheets

U.S. PATENT DOCUMENTS

| | | | |
|---|---|---|---|
| 5,159,632 | A | 10/1992 | Crandall |
| 5,271,061 | A | 12/1993 | Crandall |
| 5,272,755 | A | 12/1993 | Miyaji et al. |
| 5,581,616 | A | 12/1996 | Crandall |
| 6,061,448 | A | 5/2000 | Smith et al. |
| 6,098,056 | A | 8/2000 | Rusnak et al. |
| 6,192,407 | B1 | 2/2001 | Smith et al. |
| 6,275,939 | B1 | 8/2001 | Garrison |
| 6,377,688 | B1 | 4/2002 | Numao |
| 6,487,599 | B1 | 11/2002 | Smith et al. |
| 6,609,196 | B1 | 8/2003 | Dickinson, III et al. |
| 7,266,847 | B2 * | 9/2007 | Pauker et al. .................. 726/27 |
| 7,526,114 | B2 * | 4/2009 | Xia et al. ..................... 382/128 |
| 2002/0046286 | A1 | 4/2002 | Caldwell et al. |
| 2002/0076042 | A1 | 6/2002 | Sandhu et al. |
| 2003/0046407 | A1 * | 3/2003 | Erickson et al. ............. 709/229 |
| 2004/0019779 | A1 * | 1/2004 | Harrison et al. ............. 713/150 |

FOREIGN PATENT DOCUMENTS

| | | |
|---|---|---|
| WO | WO 03/001326 A2 | 1/2003 |

OTHER PUBLICATIONS

Xuhua Ding et al., "Simple Identity-Based Cryptography with Mediated RSA," Topics in cryptology, CT-RSA 2003, Springer-Verlag, Lecture Notes in Computer Science, ISBN: 978-3-540-00847-7, Apr. 17, 2003, pp. 193-210, vol. 2612, San Francisco, CA, USA.

Benoit Libert et al., "Efficient revocation and threshold pairing based cryptosystems,"Proceedings of the twenty-second annual symposium on principles of distributed computing, ISBN: 1-58113-708-7, Jul. 16, 2003, pp. 163-171, Boston, Massachusetts, USA.

Menezes et al., "Ch. 13 Key Management Techniques," "Handbook of Applied Cryptography," CRC Press, ISBN: 0-8493-8523-7, 1997, pp. 548-550, Boca Raton, FL, USA.

Adabi et al., "Certified Email with a Light On-line Trusted Third Party: Design and Implementation," 11th International world wide web conference, security for web applications and P2P, ACM, Association for Computer Machinery, ISBN: 1-58113-449-5, May 11, 2002, pp. 387-395, Honolulu, Hawaii, USA.

Jeremy Horwits and Ben Lynn, "Toward Hierarchical Identity-Based Encryption," Advances in Cryptology: Eurocrypt 2002, Lecture Notes in Computer Science, vol. 2332, pp. 466-481, 2002.

Xuejia Lai and James L. Massey, "A Proposal for a New Block Encryption Standard,". Advances in Cryptology - EUROCRYPT '90, pp. 389-404, Proceedings, LNCS 473, Springer-Verlag, 1991.

Mont et al., "The HP Time Vault Serivce: Exploiting IBE for Timed Release of Confidential Information", May 2003, ACM, pp. 160-169.

Hess et al., "An Access Control Model for Dynamic Client-Side Content", Jun. 2003, ACM, pp. 207-216.

Grant Buckler, "ING Canada chooses identity-based encryption for e-mail", Jan. 2007, IT Business CA, pp. 1-2.

* cited by examiner

SECURE MESSAGE SYSTEM WITH REMOTE DECRYPTION SERVICE

This application is a continuation of patent application Ser. No. 10/744,851, filed Dec. 22, 2003, now U.S. Pat. No. 7,266,847 which claims the benefit of provisional patent application No. 60/505,954, filed Sep. 25, 2003, and both of which are hereby incorporated by reference herein in their entireties.

BACKGROUND OF THE INVENTION

This invention relates to cryptographic systems, and more particularly, to systems with remote decryption services that decrypt encrypted messages for recipients who cannot decrypt messages on their own.

A variety of cryptographic techniques are used to encrypt email messages. With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKE cryptographic systems.

Identity-based-encryption (IBE) systems have also been proposed. As with PKE cryptographic systems, a sender in an IBE system may encrypt a message for a given recipient using the recipient's public key. The recipient may then decrypt the message using the recipient's corresponding private key. The recipient can obtain the private key from a private key generator associated with the recipient.

Unlike PKE schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

A recipient of an encrypted email message must generally use decryption software to decrypt the message. However, in some environments it may be difficult or impossible to install such decryption software. For example, if a mail recipient is traveling and wishes to access their email through a public Internet terminal, it will not generally be possible for the recipient to download and install decryption software on the public terminal. In many business networks, system administrators place restrictions on which software can be downloaded and installed on the computers of the network. Users are often not permitted to install any software on their computers. Restrictions such as these have served to hinder the widespread use of encryption in email messaging.

It would be desirable to be able to provide ways to decrypt messages for recipients who have not loaded decryption software onto their computers.

SUMMARY OF THE INVENTION

The present invention relates to systems for encrypting and decrypting messages and to methods for using such systems. Messages may be encrypted and decrypted using remote services.

A sender of a message may encrypt message content using an identity-based-encryption (IBE) encryption algorithm or a traditional public key encryption (PKE) algorithm such as the RSA algorithm. Encrypted content may be encrypted using the IBE or PKE public key of a desired message recipient.

The encrypted content may be sent to the recipient over a communications network such as the Internet. Some recipients may have local decryption capabilities. Such recipients can locally decrypt the encrypted message content.

Other recipients do not have local decryption capabilities on their equipment. Such recipients can upload the encrypted content to a remote decryption service over the Internet. The decryption service can decrypt the encrypted message content for the recipient and can provide the recipient with access to the decrypted message content over the Internet. The recipient can, for example, be provided with a web page in which the decrypted content is display or may be provided with a list of URLs that can be used to download the decrypted content to the recipient's equipment.

With one suitable approach, a recipient of an encrypted message may save encrypted message content locally. The message from the sender may include a URL associated with the decryption service. After saving the encrypted content locally, the recipient can click on the URL in the message. This directs the recipient's web browser to display a web page associated with the decryption service. The web page may be used by the decryption service to collect recipient credential information such as username and password information (if desired). The web page also allows the recipient to select which locally-saved encrypted message content is to be uploaded to the decryption service. The decryption service can use the recipient credential information from the recipient to authenticate the recipient. Once the recipient has been authenticated, the decryption service can obtain the private key of the recipient from a private key service. The private key may be used by a decryption engine at the decryption service to decrypt the uploaded encrypted content from the recipient. The decrypted version of the uploaded content may be provided to the recipient over the Internet.

If desired, encrypted content may be placed in a markup language form such as an html form or other suitable form. A sender may encrypt content and place the encrypted content into the form as a form element. Form elements may also be created that facilitate the collection of recipient credential information. The form may be incorporated into the body of a message for a recipient or may be attached to the message. When there is a large amount of content to encrypt or when there are many files to encrypt, the sender can create a message that has multiple attachments. Each attachment can be a form having a form element containing different encrypted message content.

The form elements containing the encrypted content may be hidden form elements, so as to reduce visual clutter when the form is displayed. When a message with a form is received by a recipient, the recipient's email application or other software may display the form for the recipient. The recipient can fill in form elements requesting recipient credential information. The form may contain a user-selectable option for uploading the encrypted content and recipient credential information to the decryption service. When the recipient clicks on the option, an http POST or GET operation (or other suitable process) may be used to post the encrypted content from the form elements to a remote decryption service. The recipient credential information may also be sent to the decryption service.

The decryption service may authenticate the recipient, obtain an appropriate private key for the recipient from a private key service, and decrypt the uploaded encrypted message content to create decrypted message content. The decryption service may then provide the recipient with access to the decrypted message content over the Internet.

Not all recipients need remote decryption services, so, if desired, the encrypted content that is embedded in the forms may be replicated in the message body. With this type of arrangement, those recipients that have locally-implemented decryption capabilities can automatically decrypt and display the encrypted content on their equipment, without the need to upload the encrypted content for remote decryption.

The operating system of recipients that have local decryption capabilities can be instructed to use a document handler application whenever a form attachment is opened. If a form containing encrypted content is opened by a recipient without local decryption capabilities, the form will provide the recipient with an opportunity to upload the encrypted content to a remote decryption service over the Internet. If the same form is opened by a recipient that has local decryption capabilities, the document handler application examines the form to determine whether it contains encrypted content. If the form contains encrypted content, the form need not be displayed on the recipient's equipment. Rather, encrypted content from the form can be automatically decrypted locally at the recipient. The resulting decrypted content may then be automatically displayed for the recipient (e.g., by displaying the content in the recipient's email program or by displaying the content in an application program suitable for the type of content that is being displayed).

Encrypted message content may be sent to recipients using embedded GIF tags. With this approach, an encrypted message may be divided into small pieces, each of which is placed in a GIF tag. The GIF tags may also be provided with a domain name portion that identifies a remote decryption service, a message identifier that helps the decryption service identify which message each part of the encrypted message is associated with, and a part or piece number that may be used by the decryption service to reassemble the pieces of the encrypted message. When a recipient's web browser attempt to display a message containing the embedded GIF tags, the encrypted message content is automatically sent to the decryption service, which reassembles the encrypted message from the small pieces of the message. After reassembling the encrypted message, the decryption service decrypts the message and provides the recipient with access to the decrypted message contents.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to systems that use encryption to provide secure messaging capabilities. The invention also relates to methods for using such systems to support secure messaging.

Figure 1:
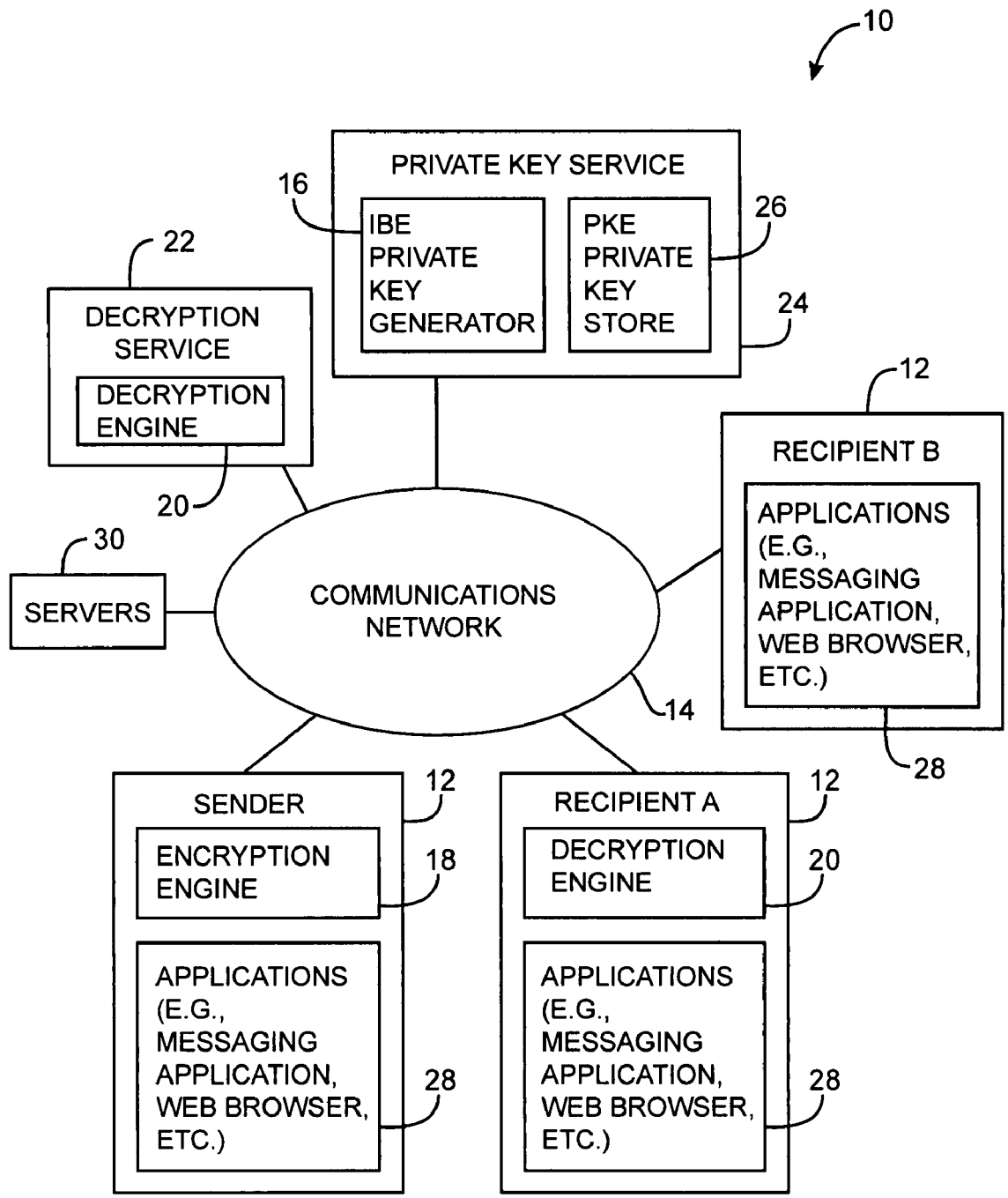
FIG. 1 is a diagram of an illustrative system in which messages may be encrypted and decrypted in accordance with the present invention.

Equipment of the type shown in FIG. 1 may be used to support secure messaging. A user in system 10 may send a secure message to one or more other users over a communications network 14. A sender is a user who sends a message. A recipient is a user who receives a message.

There are at least two types of recipients in system 10. Some recipients (like recipient A) are capable of installing software packages on their equipment. Accordingly, recipients such as recipient A can install and use decryption software such as decryption engine 20 to decrypt encrypted messages. Other recipients (like recipient B) do not install decryption software locally on their equipment. Such recipients are either not interested in installing decryption software on their equipment or are not permitted to install software. Recipients such as recipient B may, for example, be using a public Internet terminal or a personal computer in an business environment in which the system administrator prohibits installation of software by users.

The present invention is sometimes described in connection with system environments in which the senders and recipients are individuals. In general, however, senders and recipients may be individuals, groups of individuals, organizations, parts of organizations, or any other suitable parties or entities that exchange messages.

Moreover, the messages that are carried by the system need not be email messages, although email messages are used as an example. The messages may be email messages, instant messages, or any other suitable electronically-conveyed message. Messages may include any digital information (e.g., text, graphics, audio, video, commands, executable code, data, etc.) that it is desired to convey electronically between senders and recipients.

Users may communicate with each other using equipment 12. Equipment 12 may, for example, include computing equipment such as a personal computers, portable computers, workstations, mainframe computers, networked computers or terminals, handheld computers, or any other suitable electronic equipment. Multiple individuals or organizations may use the same device. For example, a group of workers in an office may share the use of a single computer terminal that is connected to a host computer in a local area network.

The equipment of FIG. 1 may be interconnected by communications paths in communications network 14. Network 14 may include the Internet and other wide area networks, one or more local area networks, switched telephone networks, networks such as virtual private networks, networks including dedicated leased lines, networks based on wired or wireless paths, or any other networks formed using any other suitable network technology.

The operation of system 10 may involve the use of traditional public-key-encryption cryptographic techniques such as those used with RSA public-key cryptography. For example, a sender may use the RSA algorithm or other traditional public key encryption algorithm to encrypt a message for a recipient. Such techniques may also be used to secure communications paths in system 10. For example, the RSA algorithm is used in the secure sockets layer (SSL) protocol, which can be used to secure communications paths between parties when an application such as a web browser is being used. Digital signatures can also be implemented using traditional public-key-encryption techniques. These traditional public key cryptographic techniques are referred to herein as "PKE" cryptographic techniques.

The operation of system 10 may also involve the use of identity-based-encryption (IBE) cryptographic techniques. These cryptographic techniques are referred to herein as "IBE" cryptographic techniques.

PKE and IBE encryption schemes use an asymmetric approach. Some information (so-called public key information) is used to encrypt data. Other corresponding information (so-called private key information) is used to decrypt the encrypted data.

One or more services such as private key service 24 may be used to provide private keys. A private key service may include one or more IBE private key generators such as IBE private key generator 16 for generating IBE private keys. PKE private keys may be generated using one or more PKE private key generators. After private keys are generated, they may be stored in a PKE private key store such as PKE private key store 26 at key service 24.

Messages may be encrypted at a sender using an encryption engine 18. Encrypted messages may be decrypted using a decryption engine 20. Encryption engine 18 and decryption engine 20 may use IBE and/or PKE encryption algorithms to encrypt and decrypt message content. Recipients such as recipient B can decrypt messages using a decryption engine 20 at a remote decryption service 22. Some recipients, such as recipient A, may install and run a decryption engine 20 on their own equipment 12.

Users may have software applications 28 such as email applications, email applications with web browser engines (i.e., built-in web browser capabilities), web browser applications, document creation and editing applications, image viewers, media players, etc. The functions of the encryption and decryption engines may be provided using stand-alone encryption and decryption applications or using encryption and decryption software components that are integrated with applications 28. As an example, an email program such as an email program used by a sender may have an encryption engine 18. The encryption engine 18 may be provided as part of the native code in the email application or may be installed as a plug-in module. As another example, a user such as recipient A may have a decryption engine 20 on equipment 12. The decryption engine 20 at recipient A may be built into recipient A's email application (and other applications) or may be provided as a separate software component. Some or all of the functions of encryption engine 18 and decryption engine 20 may be provided as part of an operating system or may use operating system functions during their execution.

Various computing devices may be used in system 10. For example, computing equipment may be used to implement the functions of a server or other computer equipment at each IBE private key generator 16, at each PKE private key store 26, at decryption service 22, etc. Servers 30 may also be used to support the functions of an IBE public parameter directory, an IBE public parameter host, a PKE public key database, a certificate authority, mail servers, and other entities. Such servers may be co-located with a sender, may be connected to the network 14 as an independent third-party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is sometimes referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic message may be sent. For clarity, the present invention is generally described in the context of email messages. This is merely illustrative. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient. Other user activities in system 10 may be entirely automated so that no human intervention is generally required. As one example, the user at one device 12 may be a banking institution that desires to use encrypted email communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. System functions involved in presenting on-screen options for humans to respond to (e.g., by clicking on them using a computer mouse) can be automated using software running on the components of the system. Situations where a particular function may involve manual intervention or a computer-implemented operation will be clear from context in the following discussion.

During operation of system 10, certain entities such as decryption service 22 and private key service 24 may need to verify that a given party has permission to obtain a private key, to access the contents of a particular message, or to perform other functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password (i.e., credentials that a user has established with their bank or other organization). Certificate authorities may create digital certificates that help to verify the identities of certain parties. Digital signatures (e.g., signatures from a certificate authority or other entity that use private keys and that can be verified using matching public keys) may be used to ensure that a message or other signed information is associated with a particular party. Sometimes an authentication process in system 10 may involve the generation of a ticket such as a Kerberos ticket or other proof of authorization. Information such as ticket information or other information that is derived from or based on recipient credential information is referred to herein as "recipient credential information" or "recipient credentials."

Sometimes authentication information and other information (in addition to the messages being sent from the senders to the recipients in system 10) such as public and private keys must be conveyed between parties securely (e.g., between a sender and a private key generator or between equipment associated with a recipient and a private key generator, etc.). A number of different approaches may be used to convey information in system 10 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., because the communications path is physically under the control of a trusted party), and information may be conveyed securely by encrypting the information (e.g., in a message) before sending it over an insecure (or secure) link.

To enhance the efficiency of the IBE and PKE decryption and encryption processes, "two-step" decryption techniques may be used in which a message key (e.g., a symmetric message key) is used to encrypt the contents of a message prior to transmission to the recipient. Public key encryption may then be used to encrypt the symmetric message key. The message that is sent from the sender to the recipient contains the IBE-encrypted or PKE-encrypted message key and the message-key-encrypted message contents. During decryption, the IBE private key or PKE private key corresponding to the public key that was used to encrypt the message key may be used to decrypt the message key. The message key may then be used to decrypt the rest of the message. These two-step processes may be more efficient than "pure" or "single step" encryption algorithms in which the PKE or IBE algorithm alone is used to encrypt the entire message. Both types of approaches (and analogous multi-layer encryption approaches) are generally referred to herein as simply "IBE" or "PKE" or "public key" schemes for clarity.

PKE encryption schemes may be implemented using any suitable scheme. As an example, the well-known RSA cryptographic algorithm may be used for PKE encryption and decryption. One or more PKE key generators may be used to generate public-key/private-key pairs. The public keys may be published for use by message senders who desire to encrypt messages using PKE. Any suitable publishing scheme may be used to distribute PKE public keys. For example, PKE public keys may be distributed by users in a peer-to-peer fashion or may be placed on a directory or other public database for access by message senders over network 14, etc. PKE private keys may be provided to recipients such as recipient A for use in local PKE decryption on the equipment 12 of recipient A and can be provided to databases such as PKE private key store 26 for use by decryption services such as decryption service 22 when decrypting PKE-encrypted messages for a recipient such as recipient B.

Figure 2:
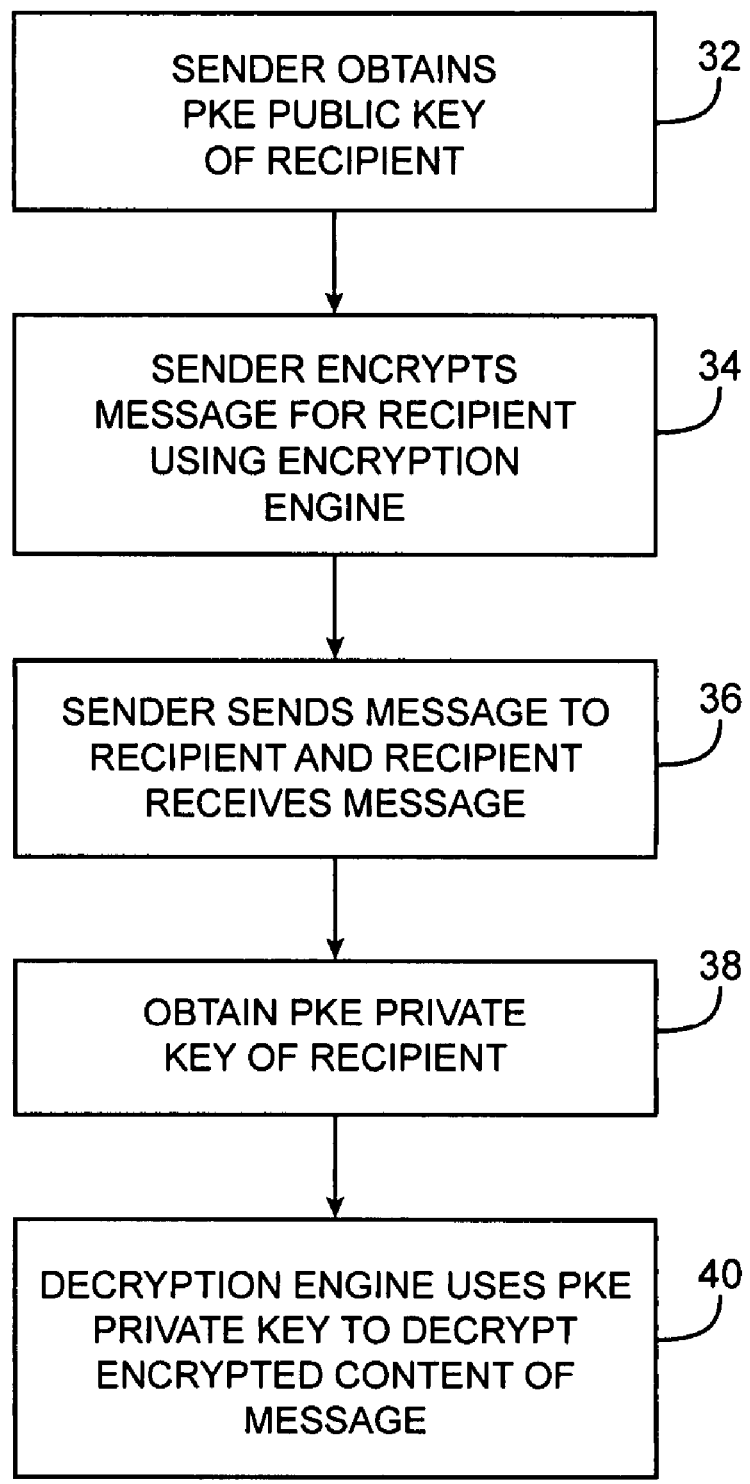
FIG. 2 is a flow chart of illustrative steps involved in using PKE encryption to support secure messaging in accordance with the present invention.

Illustrative steps involved in using PKE techniques to support secure messaging functions in system 10 are shown in FIG. 2.

At step 32, a sender may obtain the PKE public key of a desired recipient. For example, the sender may obtain the PKE public key of a desired recipient from a public database over communications network 14.

At step 34, the sender may encrypt a message for the recipient using the PKE public key of the recipient and a PKE encryption algorithm in encryption engine 18. All or part of the message content may be encrypted to create the encrypted message. For example, some information, such as message header information may not be encrypted whereas other information, such as message body text and one or more message attachments, may be encrypted. The message may also be formatted appropriately to facilitate remote decryption by recipients who do not have local decryption capabilities (i.e., because they have not installed a decryption engine 20 on their own equipment 12).

At step 36, the sender may send the encrypted message to the recipient over network 14. The recipient may receive the message. The message may pass through mail servers and other intermediate equipment between the sender's equipment 12 and the recipient's equipment 12.

At step 38, the PKE private key of the recipient may be obtained for use by the decryption engine 20 that is to decrypt the encrypted message. The PKE private key may be obtained for use by a local decryption engine 20 or by a decryption engine 20 at a remote decryption service 22. Decryption service 22 may be associated with a sender (i.e., service 22 may be affiliated with the same organization as the sender's organization), may be affiliated with other suitable parties in system 10, or may be an independent third-party service. During the process of obtaining the PKE private key, the recipient's credentials may be required (e.g., by the decryption service and/or private key service) to prove that the key requester is authorized to obtain the private key. If desired, the decryption service 22 and/or a given recipient such as recipient A may retain a copy of the PKE private key for the recipient for use in future decryption operations.

At step 40, after the PKE private key has been obtained, the decryption engine 20 at the recipient or decryption service may be used to decrypt the encrypted message content. If a remote decryption service 22 is used to decrypt content, the encrypted content may be uploaded to the decryption service 22 for decryption over network 14 and the corresponding decrypted version of the content may be downloaded to the recipient over network 14 following decryption.

System 10 of FIG. 1 may also use IBE cryptographic techniques to encrypt and decrypt messages. IBE encryption schemes for system 10 can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001). See also http://eprint.iacr.org/2001/090 by Dan Boneh and Matthew Franklin. With the approach described in the work of Boneh and Franklin, IBE encryption is based on the properties of bilinear maps such as a Weil Pairing or Tate Paring. For clarity, aspects of the present invention will sometimes be described in the context of an identity-based-encryption scheme such as the elliptic curve implementation described by Boneh and Franklin. This is, however, merely illustrative. Any suitable approach for IBE encryption may be used with system 10 if desired.

Initially, when the system is set up, IBE private key generators (e.g., IBE private key generators such as IBE private key generator 16 of FIG. 1) each obtain or generate a master secret s. For example, each private key generator may create a master secret from a number that is randomly generated at the private key generator by a processor housed inside a tamper-proof enclosure. The master secret may also be produced off-site and delivered to the private key generator 16.

The master secret (also sometimes referred to as a secret master key or a master key) is secret information that is used by the private key generator 16 to generate private keys. In an environment in which a message is decrypted at a recipient (e.g., at recipient A of FIG. 1 using a decryption engine 20 on the equipment 12 of recipient A), the recipient's IBE private key can be used by the decryption engine 20 at the recipient to decrypt the encrypted message. In an environment in which a message is decrypted remotely, a decryption engine 20 with IBE capabilities may obtain and use a recipient's IBE private key for use in decrypting the message at a remote decryption service 22. For example, the decryption service 22 may obtain the IBE private key for recipient B (who does not have the ability to run IBE decryption engine 20 locally) and may then use that IBE private key to decrypt content for recipient B.

After the master secret s has been obtained, the IBE private key generator may use the master secret in generating IBE public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The IBE public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may make this information available to senders in system 10. The public parameter information may be provided to the senders using any suitable technique. For example, recipients may send the public parameter information to senders in email messages or use other suitable peer-to-peer distribution schemes. If desired, the private key generator 16 may publish the public parameter information by using a directory service or by placing the public parameter information on a particular host server that a sender can reach using an associated domain name or other suitable service name that is generated based on the recipient's public key (e.g., using a known service-name generation rule). These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance (e.g., P may be built into user software) and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the IBE public parameter information (e.g., public parameters P and sP) has been provided to a user (i.e., a sender) who desires to send an IBE-encrypted message to another user (i.e., a recipient), the sender may encrypt and send the message to the recipient. An IBE encryption algorithm in encryption engine 18 implemented on the sender's equipment may be used to encrypt the message. The encryption engine 18 may use the public parameter information (e.g., P and sP) and an appropriate IBE public key to encrypt the message. For example, the encryption engine may encrypt the message using the IBE public key associated with the recipient.

When the IBE-encrypted message is received, the IBE private key that corresponds to the IBE public key is used to decrypt the message. The IBE private key is generated by the IBE private key generator 16. A decryption engine 20 that implements an IBE decryption algorithm may be used to decrypt the IBE-encrypted message. The decryption engine 20 takes as inputs the IBE-encrypted message and the IBE private key and produces the unencrypted version of the message as an output.

If the decryption engine 20 is located at the recipient (e.g., at recipient A), the unencrypted version of the message content may be accessed locally at the recipient. If the decryption engine 20 is located at a remote decryption service 22, the recipient (e.g., recipient B) may be provided with decrypted content over network 14 using a secure path (e.g., a path secured using SSL or TLS or other suitable secure protocol).

The encryption engine 18 and decryption engine 20 may use software to implement the desired IBE encryption and decryption algorithms. Engines 18 and 20 may be provided to equipment in the system as part of the software applications used by senders and recipients (e.g., email messaging software), as part of message management software provided to organizations in system 10, as part of a mail server package, as part of an operating system, as part of a package of server administration tools, as a downloadable program or plug-in that is available to senders, recipients, and other parties in system 10, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by or based on that recipient's email address, name, or social security number.

Each IBE private key generator generally has multiple associated users. An IBE private key generator may generate an IBE private key for each of its associated users based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

When a validity period is used as part of an IBE public key Q, it is not permissible to access the contents of a message encrypted using that Q if the current date does not fall within the specified validity period. This policy may be enforced by the private key generators such as private key generator 16. If the current date is not within the validity period specified in the public key, a private key generator will refuse to generate and provide an otherwise authorized key requester (e.g., a message recipient or authorized agent for the message recipient) with a copy of the corresponding private key that is needed to decrypt the message. With this approach, IBE private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com | top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

A sender may send an IBE-encrypted message to multiple recipients. For example, a sender may send a message to a list of distinct email addresses, each associated with a different recipient each of which has a different IBE private key. In this type of scenario, the sender encrypts the message sent to each recipient differently (i.e., using the appropriate IBE public key for each intended recipient).

Figure 3:
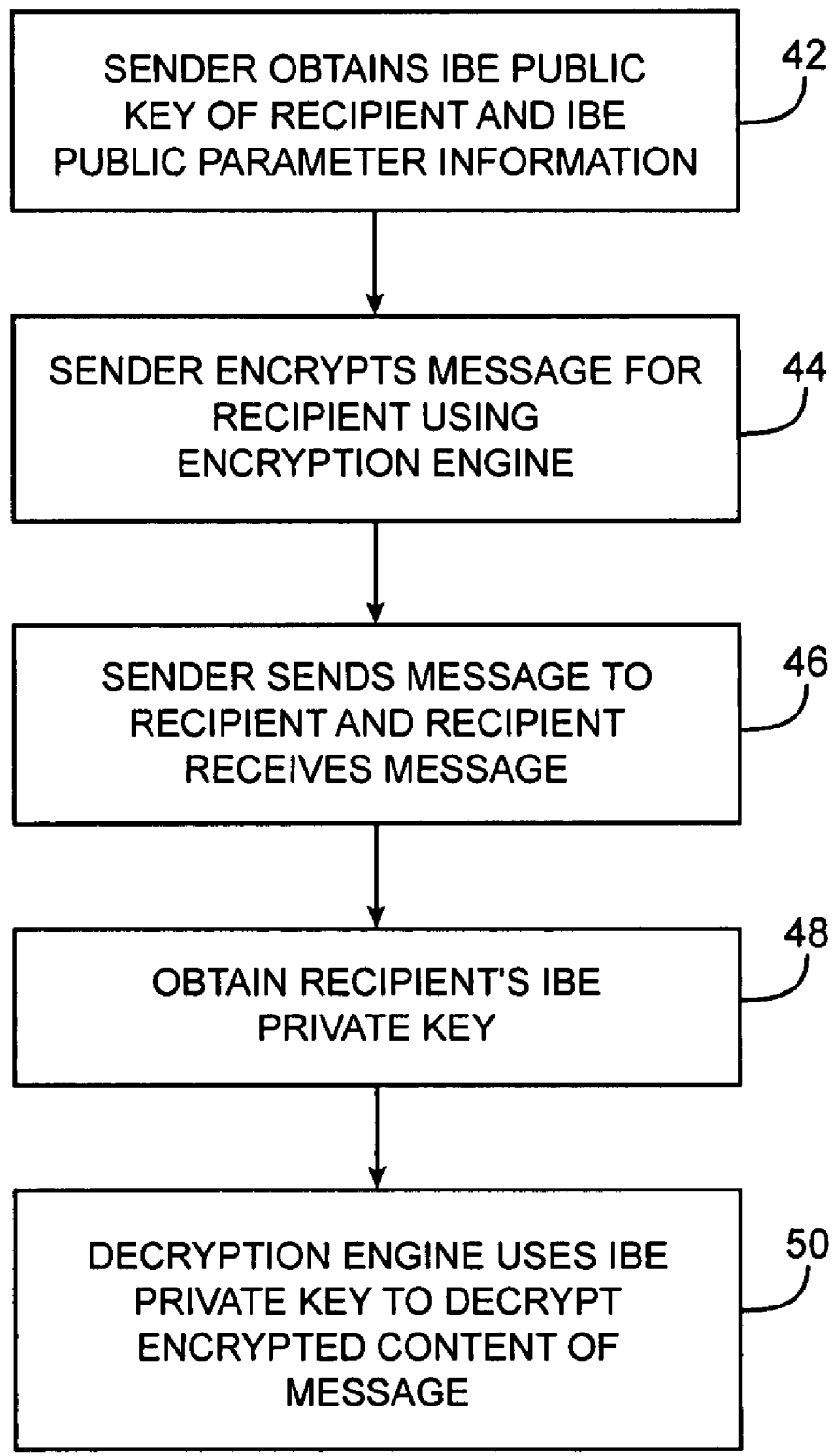
FIG. 3 is a flow chart of illustrative steps involved in using identity-based-encryption techniques to support secure messaging in accordance with the present invention.

Illustrative steps involved in using IBE techniques to send encrypted messages in system 10 are shown in FIG. 3.

At step 42, a sender who desires to send a secure message to a recipient may obtain the IBE public key of the recipient and the IBE public parameter information. Any suitable technique may be used to provide the sender with the recipient's IBE public key Q and corresponding IBE public parameters (e.g., public parameters P and sP). As an example, a sender desiring to send an IBE-encrypted message may have information sufficient to construct the IBE public key Q of the intended message recipient. This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted. The sender may obtain the IBE public parameter information from a recipient, from a directory, from IBE private key generator 16, from an IBE public parameter host service, or from any other suitable entity in system 10.

Once the sender has the IBE public key of the recipient and the appropriate corresponding public parameter information, the sender may, at step 44, use the IBE encryption process (e.g., the process of the work of Boneh and Franklin described above) to encrypt the message contents for the recipient. The IBE process may be implemented using software at the sender's equipment such as encryption engine 18. The encryption engine 18 may be a stand-alone process or application or may be incorporated into another process or application (e.g., as part of an email application, as a function in an operation system, in a virus scanning or spam-blocking application, as part of a firewall, etc.). The encryption engine 18 may take as inputs (1) the message to be encrypted, (2) the IBE public parameter information (e.g., P and sP), and (3) the IBE public key Q. The IBE process implemented using the encryption engine 18 produces an encrypted version of the message as its output.

At step 46, the sender may transmit the IBE-encrypted message to the recipient over communications network 14 and the recipient may receive the message. A sender may transmit an IBE-encrypted message to a recipient using an email program or other suitable software. To decrypt the message, an appropriate IBE private key must be obtained. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

Before the recipient or the decryption service 22 can obtain the IBE private key needed to decrypt the message content from the private key service 24 and IBE private key generator 16, the authorization of the recipient or decryption service 22 to obtain a copy of the IBE private key can be verified by the private key service (e.g., by IBE private key generator 16).

Authorization to access the contents of a message may be verified using authentication information (credentials) from the recipient and using other information (e.g., independently-gathered information on the current date). The private key generator 16 may use the access policy embodied in the IBE public key (in conjunction with optional additional policy criteria) to determine whether a given recipient is authorized. The recipient may act alone (i.e., when the IBE private key is used for local decryption) or the decryption service 22 may act for the recipient (i.e., when the decryption service 22 is remotely decrypting encrypted content on behalf of the recipient). Once the IBE private key generator 16 verifies that the recipient is authorized to access the message contents, the private key may be generated by the IBE private key generator 16. The decryption engine 20 to be used in decrypting the encrypted content may obtain the IBE private key of the recipient at step 48. The decryption engine 20 that obtains the IBE private key may be a locally-implemented decryption engine (e.g., decryption engine 20 on the equipment 12 of recipient A) or may be remotely-implemented decryption engine (e.g., decryption engine 20 of decryption service 22).

Any suitable scheme may be used to prove to the private key service 24 that the appropriate decryption engine is authorized to obtain the IBE private key. As an example, username and password information may be supplied to the private key service 24. If the username and password information that is provided matches username and password information that the private key service has in a database of valid usernames and passwords, the private key service 24 can release the requested IBE private key. The use of a username and password for authentication is merely illustrative. Biometric information, information from a hardware token, a ticket, or any other suitable recipient credential information may be used in proving that the recipient (i.e., the recipient acting alone or the recipient's agent such as decryption service 22) is authorized to obtain the requested IBE private key.

Regardless of how the IBE private key generator 16 determines that the recipient is authorized to obtain the IBE private key, during step 48, the IBE private key is provided to the decryption engine 20 that is to decrypt the IBE-encrypted message content. The private key is preferably provided to the decryption engine 20 securely. For example, the private key may be transmitted to the decryption engine 20 in an email or other suitable message or may be downloaded over the Internet or a local area network (as part of a stand-alone downloadable application or a downloadable plug-in module, as a stand-alone key, etc.). A secure communications channel over network 14 may be used for electronic communications between the IBE private key generator 16 and the equipment on which the decryption engine 20 is located.

The IBE private key that is obtained at step 48 may, if desired, be stored in a cache or database on a storage device such as a memory circuit or hard drive at decryption service 22 or the recipient's equipment. If the IBE private key is stored in this way (and has not expired or otherwise become obsolete), it can be retrieved the next time a message needs to be decrypted without contacting the IBE private key generator 16 to obtain a new copy of the IBE private key over the communications network 14.

After the decryption engine 20 obtains the IBE private key, the decryption engine 20 uses the IBE private key to decrypt the encrypted message at step 50.

When a recipient such as recipient B who does not have local decryption capabilities receives a message that has PKE-encrypted or IBE-encrypted content, the recipient can provide the encrypted message to decryption service 22 for remote decryption. This approach may be used, for example, by a recipient who is traveling and is using a public Internet kiosk to access email. Because the Internet kiosk service will not allow members of the public to install software, the recipient cannot install a copy of decryption engine 20 on the Internet kiosk service. By using the decryption capabilities of the remote decryption service 22, the recipient can access the contents of an encrypted message using a web browser or other software that is already installed on the public Internet kiosk. This approach can also be used by a recipient in an organization where it is not permitted to install decryption software on user terminals.

To perform a decryption operation, decryption service 22 can obtain recipient credential information from the recipient (if this information has not already been provided and stored) and a copy of the encrypted content. The decryption service can use the recipient credential information to prove to the private key service 24 that the decryption service 22 is authorized to obtain a copy of the recipient's IBE or PKE private key. Once the decryption service 22 has been authorized, the appropriate private key may be securely provided to the decryption service 22 over communications network 14.

The decryption service 22 runs decryption engine 20 on the equipment of the decryption service 22 to decrypt the encrypted content. The decryption engine 20 uses as inputs the private key from the private key service and the encrypted message content provided by the recipient. Once the message has been decrypted, the decryption service 22 may provide the recipient with access to the decrypted content over network 14.

Any suitable technique may be used to convey recipient credential information and encrypted content to the decryption service and to provide the recipient with access to the decrypted content. One suitable approach involves embedding a URL (or other suitable link) to the decryption service 22 in each encrypted message that is sent in the system 10. When a recipient receives a message of this type, the recipient can use the link to upload encrypted message content and recipient credential information to the decryption service. After the message has been decrypted, the decryption service 22 may provide the recipient with access to the decrypted content by displaying the decrypted content in the recipient's web browser (or other application) and/or by providing the recipient with an opportunity to download the unencrypted content to local storage.

Figure 4:
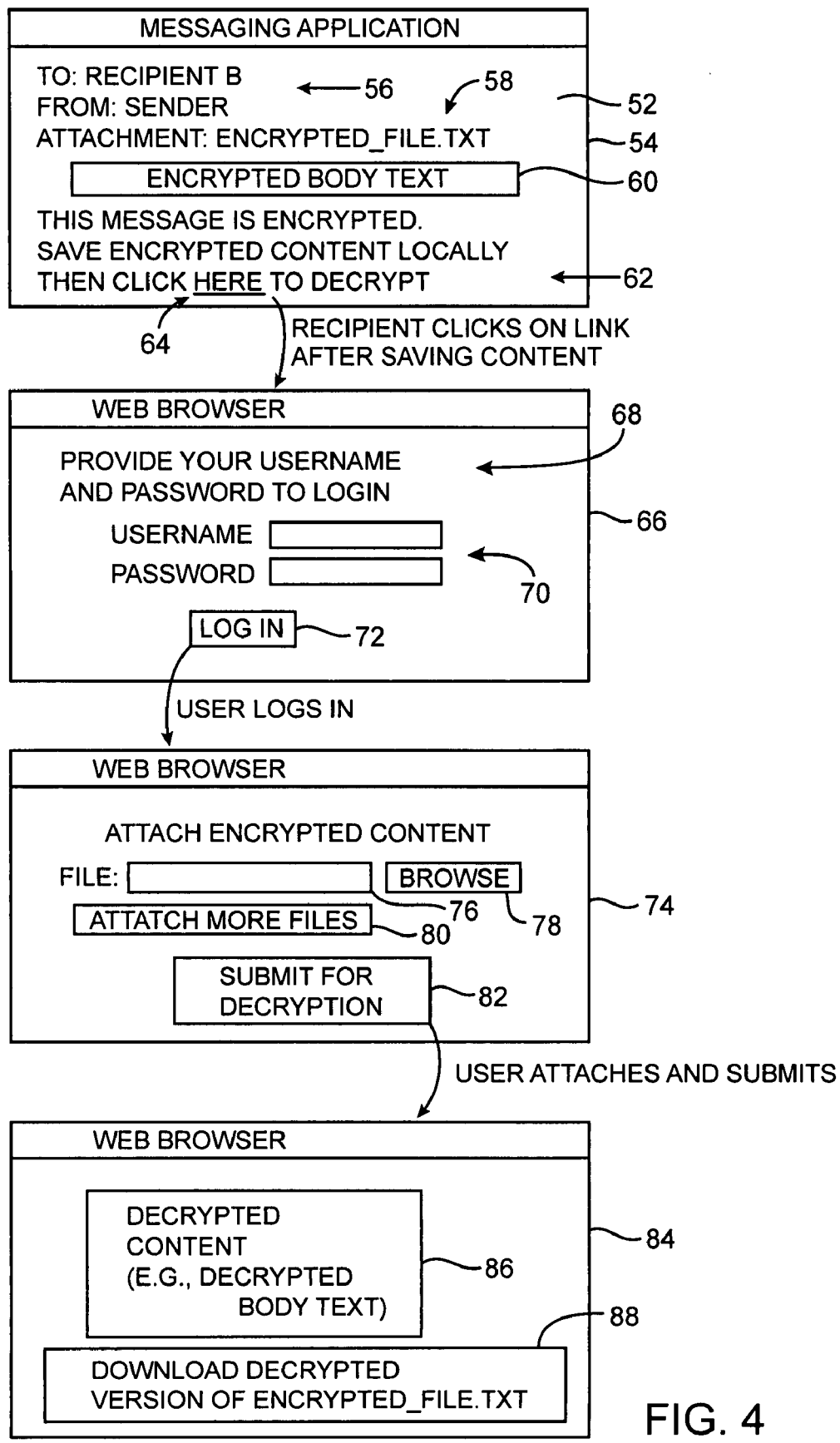
FIG. 4 is a diagram showing how a message with encrypted content and a URL identifying a remote decryption service can be decrypted using the remote decryption service in accordance with the present invention.

An illustrative arrangement of this type is shown in FIG. 4. A message recipient such as recipient B may receive and display an encrypted message using a suitable application 28 on the recipient's equipment 12. The application may be, for example, an email application (without decryption capabilities), a web browser application, or any other suitable software for viewing messages. A recipient who is using a public resource such as a public Internet kiosk may only have access to a web browser. Such recipients can view their mail using the web-mail features of their email service. A recipient who is at an organization with a policy of "locking down" their user's computers may be able to view mail using an email program or a web-mail arrangement.

In the example of FIG. 4 and the examples of the other FIGS., the recipient is shown as interacting with a number of screens of information. Some screens (e.g., the screen at the top of FIG. 4) are labeled "messaging application" to indicate that an email program or other such messaging-oriented application 28 may be used to display such a screen. Other screens (e.g., the screen at the bottom of FIG. 4) are labeled "web browser" to indicate that a web browser or software with web browsing functions may be used to display such a screen. Because various different types of applications may be used to display different screens to the recipient, the screen labels of the FIGS. are, in general, illustrative and not mutually exclusive. Other types of applications may be used to provide the displayed screens if desired.

As shown in FIG. 4, a message 52 that is received by recipient B may be displayed by a messaging application in a display screen such as screen 54. The displayed message may include header information 56 and information on attachments 58. The message attachments may include IBE-encrypted or PKE-encrypted attachments. In the example of FIG. 4, an encrypted file called "encrypted_file.txt" is included as an attachment to the message 52. The encrypted file attachment may be encrypted and attached to the message by encryption engine 18 and applications 28 at the sender during the process of encrypting and preparing the message for transmission from the sender to the recipient.

The message 52 may also include encrypted content that is provided as part of the body of the message 52 (i.e., encrypted message body text). This encrypted body content may be displayed in its raw, unencrypted form, so that it appears as a string of unreadable encoded text to the viewer (i.e., "3jivdn7t nhv84iobyt9342pn" . . . ). As part of the same message body, the message 52 may contain instructions 62 (in text, graphics, etc.) that inform the recipient that the message is encrypted. The instructions 62 may inform the recipient to save attachments and/or information from the message body locally, on the recipient's equipment 12 (e.g., on the hard drive or other local storage of recipient B). Local saving may be accomplished using any suitable technique. For example, the recipient may right-click on an attachment and use a "save as . . . " option to save the attachment locally under an appropriate file name, if this capability is supported by the recipient's operating system. Body content may be saved locally using cut-and-paste procedures.

The instructions 62 may also direct the recipient to click on a link 64 to begin the decryption process. The link 64 may be, for example, a URL for a web server at the decryption service 22 or another suitable selectable option or button in the body of message 52 that can be selected by the recipient to initiate the process of decrypting the message.

When the recipient selects the decryption option (e.g., by clicking on the URL in the instructions 62 of message 52), the recipient's web browser is launched (if it is not already active). The web browser retrieves the web page corresponding to the link 64 and displays this page in a display screen such as display screen 66. Display screen 66 may contain further instructions 68 for the recipient. The instructions 68 may, for example, direct the recipient to provide recipient credential information. To assure the recipient that it is safe to provide recipient credential information, the message may include information identifying the sender of the message (in addition to the sender address information in the header 56). For example, the message may contain the logo of the recipient's bank or other sender of the message.

Recipient credential information may be collected using any suitable approach. In the example of screen 66 of FIG. 4, the recipient is provided with username and password boxes 70 that the recipient can fill in manually. The screen 66 may also contain a selectable option such as log-in option 72 that the recipient can select to continue with the decryption process after boxes 70 have been filled in.

When the user selects log in option 72, the recipient credential information for the recipient (e.g., the recipient credential information entered into boxes 70) may be transmitted from the recipient (i.e., from recipient B) to the decryption service 22 over network 14. The decryption service 22 can use the recipient credential information to prove to the private key service 16 that the decryption service 22 is authorized to receive the private key of the recipient that is to be used to decrypt the encrypted message content. The decryption service 22 can use the recipient credential information from the recipient in its raw form or can convert the recipient credential information into a new format (e.g., by authenticating the recipient information and converting the recipient username and password into a Kerberos ticket or other information that is derived from the original uploaded version of the recipient credential information, etc.).

When the user logs in, the decryption service 22 can provide a web page to the recipient such as the illustrative web page displayed in web browser screen 74. This type of web page may provide the recipient with an opportunity to upload encrypted files from the recipient's local equipment 12 to the decryption service. With the example of FIG. 4, the recipient can either type the file path and name into file box 76 or may use browse option 78 to navigate to the appropriate locally-stored version of the encrypted message content. Additional files may be attached by selecting option 80.

When the recipient is ready to decrypt the encrypted files that have been specified using screen 74, the recipient can select submit for decryption option 82.

Selecting option 82 directs the recipient's web browser to transmit the selected encrypted files to the decryption service 22 over the network 14. When the decryption service 22 receives the encrypted content, the decryption service 22 uses decryption engine 20 to decrypt the encrypted content. The decryption service 22 can then provide the recipient with access to the decrypted version of the encrypted message. The decryption service 22 may, for example, provide a web page to the recipient such as the web page displayed in web browser screen 84 of FIG. 4.

As shown in screen 84, the web page may contain the decrypted content 86 corresponding to the encrypted information that the recipient uploaded using submit for decryption option 82. For example, the decrypted text of the attachment encrypted_file.txt 58 may be displayed as part of web page 84. As another example, if the encrypted text of encrypted body text 60 was uploaded to the decryption service 22 using option 82, the decrypted text corresponding to encrypted body text 60 can be displayed as decrypted content 86.

If desired, an option such as download option 88 may be provided in web page 84. This type of option (which may be provided as a URL) may be selected by the recipient to download a decrypted version of the encrypted content that was uploaded to the decryption service 22. As an example, when option 88 is selected (or directly in page 84), the decryption service 22 may display a list for the recipient that contains one or more URLs corresponding to the decrypted files. The recipient can (depending on the recipient's operating system) right click on the appropriate URLs and select the "save as . . . " option to begin the process of downloading and locally saving the desired decrypted content onto the recipient's equipment 12 (e.g., to the recipient's hard drive). After downloading the decrypted version of the message content, the recipient can use an appropriate application 28 (e.g., a web browser, word processing application, imaging application, media player application, etc.) to view the decrypted content.

Although the example of FIG. 4 shows the use of a single messaging application screen 54 and three web pages (screens 66, 74, and 84), the functions described in connection with FIG. 4 and the other FIGS. may, in general, be provided using any suitable number of screens. As an example, a single page might be used to allow a recipient to enter recipient credential information and to identify which files are to be decrypted, more than two pages may be used to collect this information, etc.

Figure 5A:
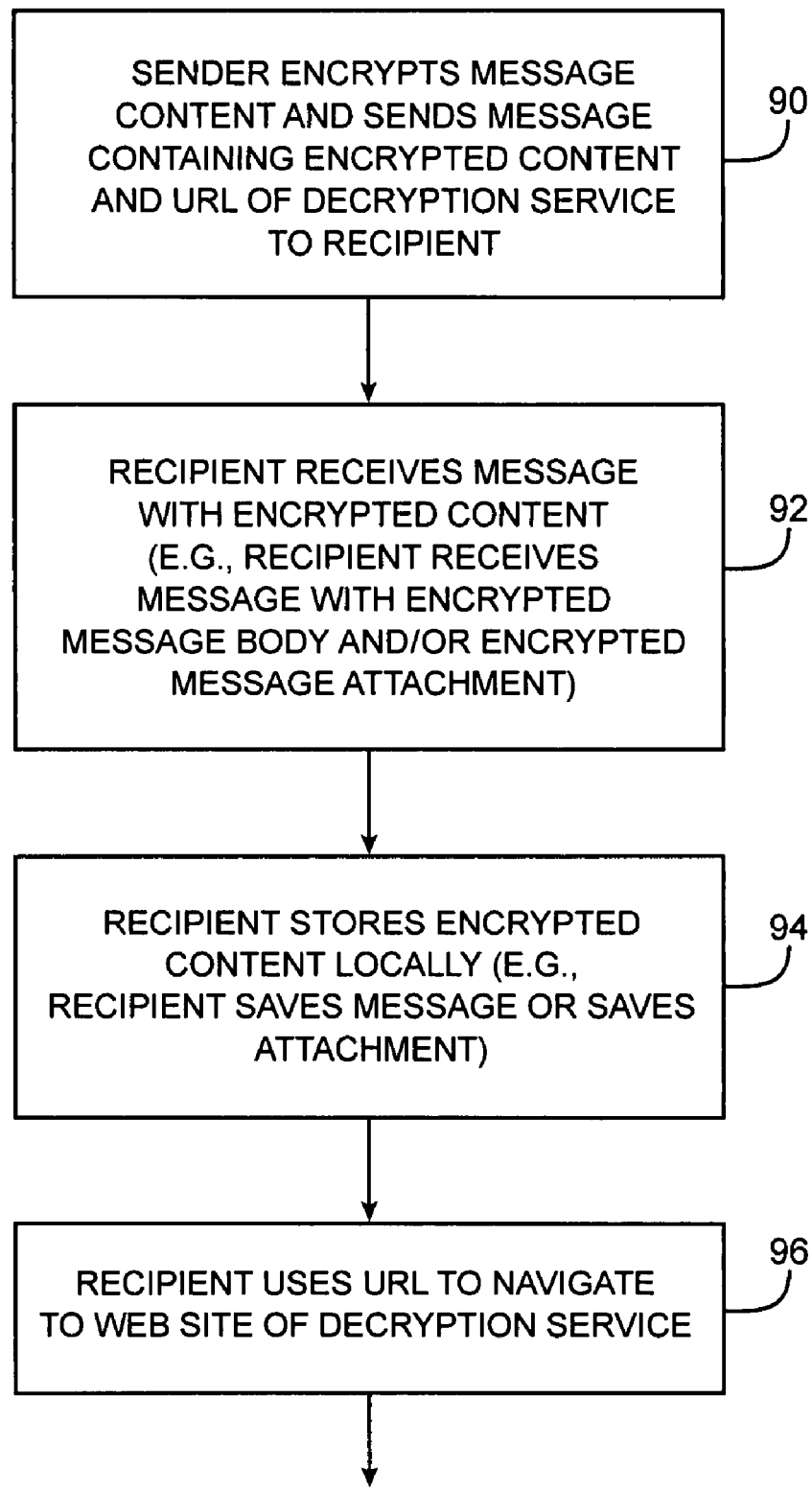
FIGS. 5a and 5b contain a flow chart of illustrative steps involved in decrypting messages remotely using a decryption arrangement of the type shown in FIG. 4 in accordance with the present invention.
Figure 5B:
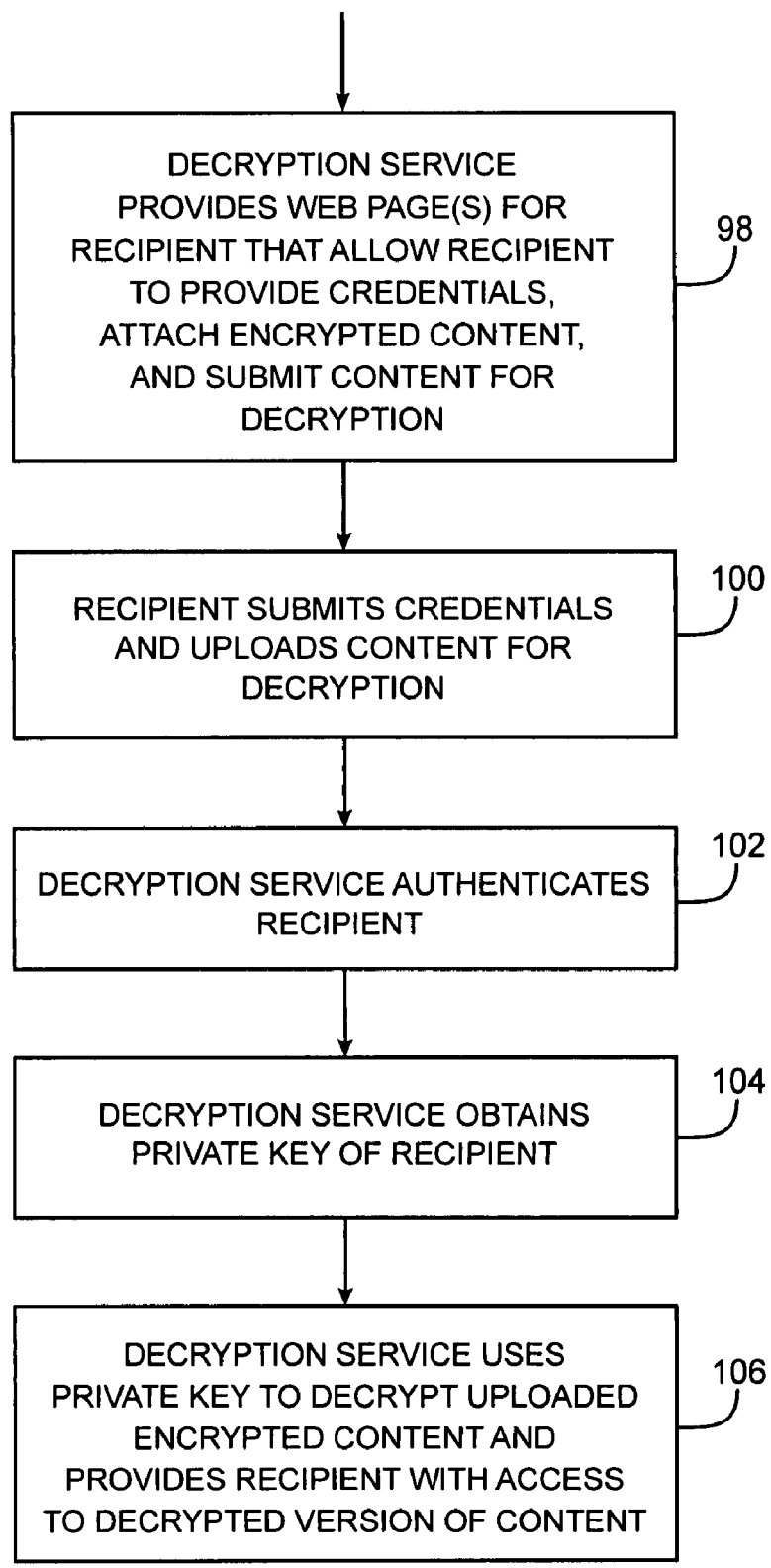

Illustrative steps involved in using an arrangement of the type shown in FIG. 4 to decrypt message content remotely are shown in the flow chart of FIGS. 5*a* and 5*b*. At step 90 (FIG. 5*a*), the sender may encrypt message content. The sender may encrypt the message content using encryption engine 18 (FIG. 1) and the public key of the recipient. A suitable application 28 (e.g., a messaging application such as an email application with encryption capabilities) may be used to add a URL corresponding to the decryption service 22 to the message body. The sender's application may also add instructions to the message (e.g., instructions on how to save content locally for uploading, how to click on the URL to initiate the decryption process, etc.) After the URL has been added, the message containing the encrypted message content and the URL may be sent to a desired recipient (e.g., recipient B) over the network 14.

At step 92, the recipient may receive the encrypted message and may use an appropriate application 28 (e.g., an email application or a web browser) to view the encrypted message.

At step 94, the recipient can follow message instructions relating to local storage of the encrypted content. For example, during step 94 the recipient can save encrypted attachments and/or encrypted body content locally on a local hard drive or other local storage on the recipient's equipment 12.

At step 96, the recipient can click on the URL in the message body that corresponds to the decryption service 22. Clicking on the URL launches the recipient's web browser and sends a request for a web page to the decryption service 22 over network 14. If desired, the instructions that are provided to the recipient in the encrypted email may instruct the recipient to navigate to a particular web site without using an embedded clickable URL in the message. When this approach is used, the recipient can enter URL information into their web browser manually or can otherwise locate the decryption service on the web without using the clickable URL.

At step 98 (FIG. 5*b*), the decryption service 44 receives the page request from the recipient's web browser and provides a corresponding web page for the recipient that allows the recipient to provide recipient credential information and to upload encrypted content from the received message for remote decryption.

At step 100, the recipient can provide information on the recipient's credentials and the content to be decrypted to the decryption service 22 over network 14. Web page(s) provided by the decryption service may be used by the recipient to provide the decryption service 22 with recipient credential information such as the recipient's username and password. The username and password may, for example, be a username and password that the recipient has previously established with a particular organization (e.g., the recipient's bank). Information on the sender of the message such as a logo may be included in the message or provided to the recipient in the web page from the decryption service. The recipient can determine which username and password should be provided to the decryption service 22 from the logo and/or text instructions. Encrypted content may be uploaded to the decryption service using any suitable arrangement. For example, the recipient can attach/select locally-stored encrypted files for uploading and can click on an upload button on a web page provided by the decryption service 22. A secure link such as a secure SSL or TLS link may be used to ensure that the recipient credential information is not disclosed to third parties during the process of transmitting the recipient credential information from the recipient to the decryption service.

At step 102, the decryption service 22 may use the recipient credential information that has been obtained from the recipient to authenticate the recipient. Any suitable authentication technique may be used to verify that the recipient is authorized to decrypt the encrypted message contents. For example, the decryption service may compare the recipient credential information to information maintained in an internal or external database of recipient credential information. The database of recipient credential information may include recipient credential information that was established when recipients established a relationship with the sender (e.g., when a bank customer created an account at a bank). If, for example, the recipient username and password that were provided to the decryption service 22 at step 100 match the username and password that the decryption service has in its database, the recipient is authenticated.

If desired, the decryption service 22 may use the authentication services of a third-party authentication service to authenticate the user (e.g., an external Windows domain controller, a Kerberos server that issues tickets for authenticated recipients, etc.). If desired, a single-sign-on solution may be used to authenticate recipients. These are merely illustrative authentication techniques that may be used. Any suitable technique may be used to ensure that a recipient is authorized to access the content of an encrypted message before the decryption service 22 decrypts the message and provides access to the decrypted message content to that recipient.

After the recipient has been authenticated, the decryption service may obtain the private key from the private key service 24 (step 104). The private key may be provided to the decryption service 22 by the private key service 24 over communications network 14 in a secure message or using a secure communications path in response to a key request submitted by the decryption service. The private key request may identify the recipient whose key is requested. For example, the request for an private key may include information on the recipient's identity (e.g., the recipient's public key). An IBE private key for the recipient may be generated by IBE private key generator 16. A PKE private key for the recipient may be retrieved from PKE private key store 26.

The private key service 24 may or may not trust the decryption service 22.

If the private key service 24 trusts the decryption service 22, all private key requests made by the decryption service 22 can be fulfilled, provided that the decryption service 22 proves its identity to the private key service 24 (e.g., by use of a trusted communications channel between the decryption service 22 and the private key service 24, by use of a digital signature on the key request, etc.).

If the private key service 24 does not trust the decryption service, or if additional security is desired, the private key service 24 may require recipient credential information before issuing the decryption service 22 a copy of the recipient's private key. The recipient information may be provided to the private key service 24 with the request for the recipient's private key. The decryption service can pass the original recipient credential information that was uploaded from the recipient to service 24 or may provide the private key service 24 with recipient credential information that is derived from the original recipient credential information (e.g., a reformatted or otherwise processed set of recipient credentials, a ticket, etc.). The private key service 24 can authenticate the recipient based on this recipient credential information. If the recipient is authorized to obtain the requested private key, the private key service 24 can provide the requested private key to the decryption service 22 for use in decrypting the encrypted message content.

In general, authentication in system 10 can be provided by the decryption service 22, by the private key service 24, by third-party services that work with the decryption service 22 and/or private key service 24, or by a combination of such services. For clarity, the present invention will be described primarily in the context of arrangements in which the decryption service 22 authenticates the recipient and in which the private key service 24 issues private keys to the decryption service 22 because the decryption service 22 proves its identity to the private key service 24 and is trusted by the private key service 24. This is however, merely illustrative. Any suitable recipient authentication process may be used in system 10 if desired.

Once a valid key request has been processed, the private key service 24 may provide the recipient's private key to the decryption service 22 over network 14. The key may be transmitted from the key service 24 to the decryption service 22 in an encrypted message or over a secure communications path (e.g., a communications link secured using the SSL or TLS protocol, etc.)

At step 106, after the decryption service 22 has obtained a copy of the recipient's private key, the decryption service 22 may use the recipient's private key to decrypt the uploaded message content and provide the recipient with access to the decrypted content. For example, if an IBE-encrypted file or PKE-encrypted file was provided to the decryption service 22 by the recipient, an IBE decryption algorithm or PKE decryption algorithm in the decryption engine 20 may be used (in combination with the appropriate IBE or PKE private key of the recipient) to decrypt that file. The unencrypted version of the file may be placed into a database on the decryption service server for retrieval by the recipient. Each recipient who has authenticated to the decryption service can view a list of their associated decrypted content (but not the content of other users).

The decrypted content (e.g., the decrypted attachment content and/or the decrypted message body content) can be provided to the recipient automatically on a web page, can be streamed to the recipient in real time (e.g., so that the recipient can view the content by clicking on a particular filename in the list to launch an appropriate application such as a video player or word processor application 28), and/or can be made available for local storage on the recipient's equipment for later viewing. With one suitable arrangement, the decrypted content may be provided to the recipient using the same web browser window that the recipient used to upload credential information and encrypted content to the decryption service. If desired, the decryption service 22 can provide the recipient with a web page containing a selectable button that the recipient can click on to begin the download process (e.g., a button labeled "click here to download the decrypted version of encrypted_file.text"). With this approach, when the recipient clicks on the button, the recipient's browser submits a request to the decryption service 22 which initiates the download process.

To maintain the secrecy of the message content, decrypted message content from decryption service 22 is preferably provided to recipients over communications network 14 using a secure path. For example, content may be provided over a path that uses a secure protocol such as the SSL protocol or the TLS protocol.

The approaches of FIGS. 4, 5*a*, and 5*b* involve local storage of encrypted content and file uploading and downloading operations. Because these operations may not be straightforward for inexperienced recipients, remote decryption capabilities can be provided using forms. The forms may be hypertext markup language (html) forms or other suitable markup language forms. The forms may also be JavaScript forms or forms based on any other suitable scripting language or language that can be executed directly or indirectly by the recipient's application 28 (e.g., by the recipient's email application). For clarity, the use of html forms is emphasized in the following examples.

Figure 6:
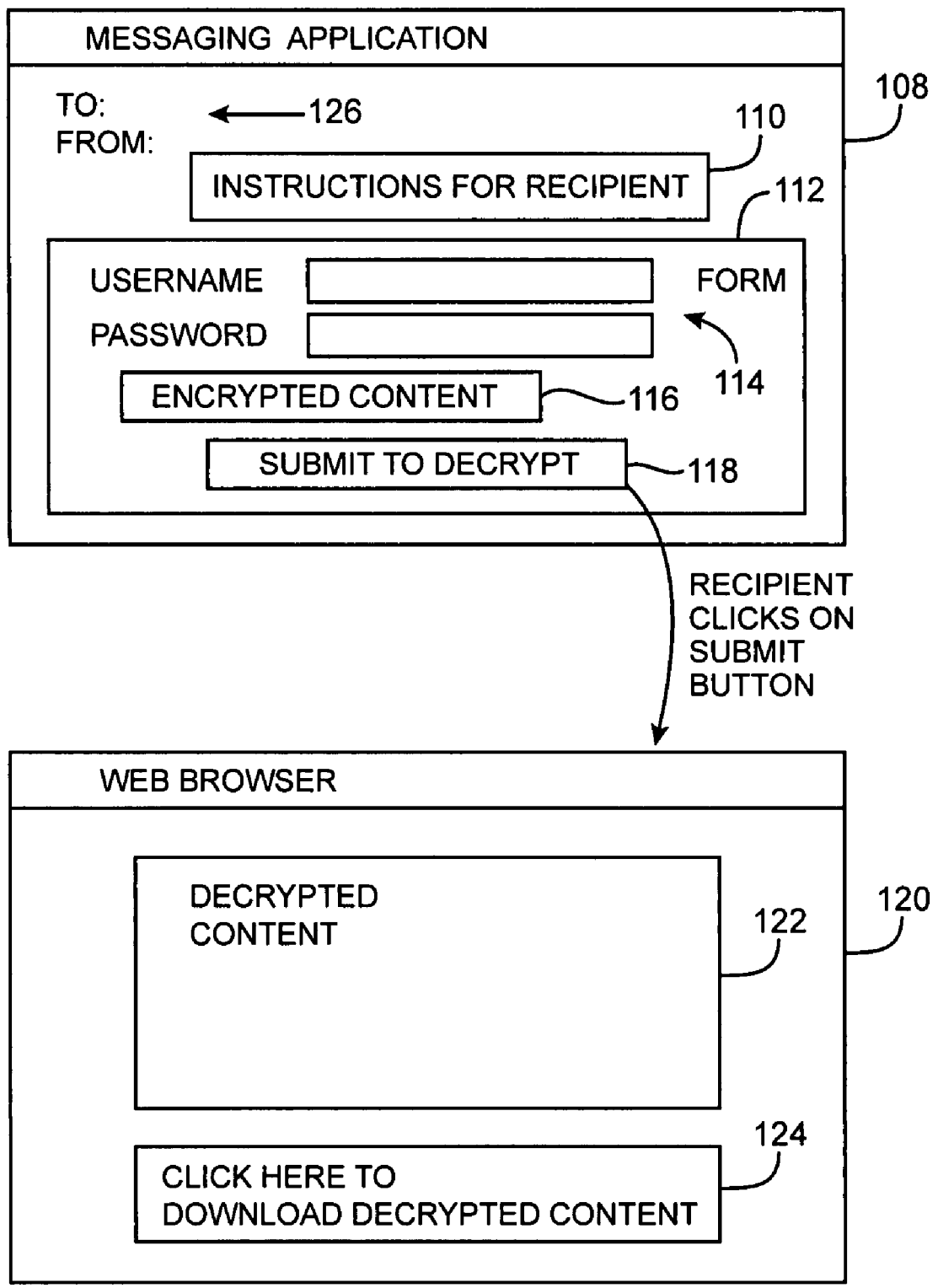
FIG. 6 is a diagram showing how a markup language form may be used to submit encrypted content to a remote decryption service in accordance with the present invention.

Illustrative screens that may be presented to a recipient of an encrypted message when a forms-based remote decryption arrangement is used are shown in FIG. 6. The recipient may view an encrypted message using any suitable application such as an email messaging application or a web browser. If a messaging application is used to view the received message, the messaging application preferably has appropriate form capabilities. For example, a suitable email program for handling messages based on html forms is an email program that has html form capabilities (i.e., the ability to call a web browser or its own web engine).

When a sender encrypts a message for the recipient, the sender's applications 28 embeds an html form (or other form) in the message. The form contains form elements (sometimes called form fields) that assist the recipient in uploading recipient credential information and encrypted content to the decryption service 22.

An illustrative display screen 108 that may be presented to a recipient by the recipient's messaging application (or other suitable forms-capable application) when an encrypted message of this type is received is shown in FIG. 6. The message of screen 108 may contain (unencrypted) header information 126. The message of screen 108 may also include unencrypted instructions 110. The instructions 110 may inform the recipient that the message contains encrypted content and may instruct the recipient on what steps need to be taken to access the content in unencrypted form. The instructions may also include information such as a logo that helps assure the recipient that the message is from a particular sender.

The message 108 may contain a html form 112. The form 112 may contain form elements. The form elements may be used to provide the recipient with an opportunity to provide recipient credential information to the decryption service 22. As an example, the form 112 may contain username and password form elements 114 into which the recipient can enter the recipient's username and password. The encrypted content of the message may be contained in a form element 116. To reduce visual clutter, the form element 116 may be hidden. When the encrypted content is provided in a hidden form element, the messaging application at the recipient suppresses the display of the encrypted content so that is not visible to the recipient. When the encrypted content is provided in an form element that is not hidden, cyphertext may be displayed on the recipient's screen 108.

Form 112 may contain an option such as option 118 that the recipient can select to initiate the remote decryption process on decryption service 22. Options such as "submit to decrypt" option 118 may be provided as form elements.

When the recipient clicks on the submit to decrypt option (form element 118), the web browsing engine of the recipient's email application (or other suitable application 28 on the recipient's equipment 12 that is being used to handle forms) sends the encrypted content of element 118 to the decryption service 22 over network 14. The recipient credential information that was provided using form elements such as form elements 114 may also be sent to the decryption service. Any suitable technique may be used to send the encrypted content of the message and the recipient credential information to the decryption service 22. With one illustrative arrangement, the web browsing engine of the recipient's email application sends the encrypted content and recipient credential information to a location specified by the form 112 using an http POST or GET operation (i.e., to send this information to the web server of the decryption service).

When the decryption service 22 receives the recipient credential information and encrypted message content, the decryption service 22 can authenticate the recipient and obtain the appropriate private key to use in decrypting the encrypted content from the private key service 24. The decryption engine 20 at the decryption service 22 may then be used to decrypt the encrypted message content from form element 116.

The recipient can be provided with access to the decrypted version of the message using any suitable technique. For example, the decryption service 22 can automatically stream the decrypted content to the recipient or can allow the recipient to download the decrypted content to the recipient's hard drive or other local storage device on the recipient's equipment 12. The recipient can then access the content using an application 28 on the recipient's equipment.

With one suitable arrangement, the recipient's web browser is launched when the user clicks on submit to decrypt form element 118. The web browser displays a web page of decrypted message content 122 and/or decrypted content download options such as option 124 for the recipient, as shown in FIG. 6.

The decrypted content may be provided to the recipient securely. For example, the decrypted message content obtained from decryption service 22 when option 118 is selected may be provided to recipients over communications network 14 using a path that uses a secure protocol such as the SSL protocol or the TLS protocol.

Figure 7:
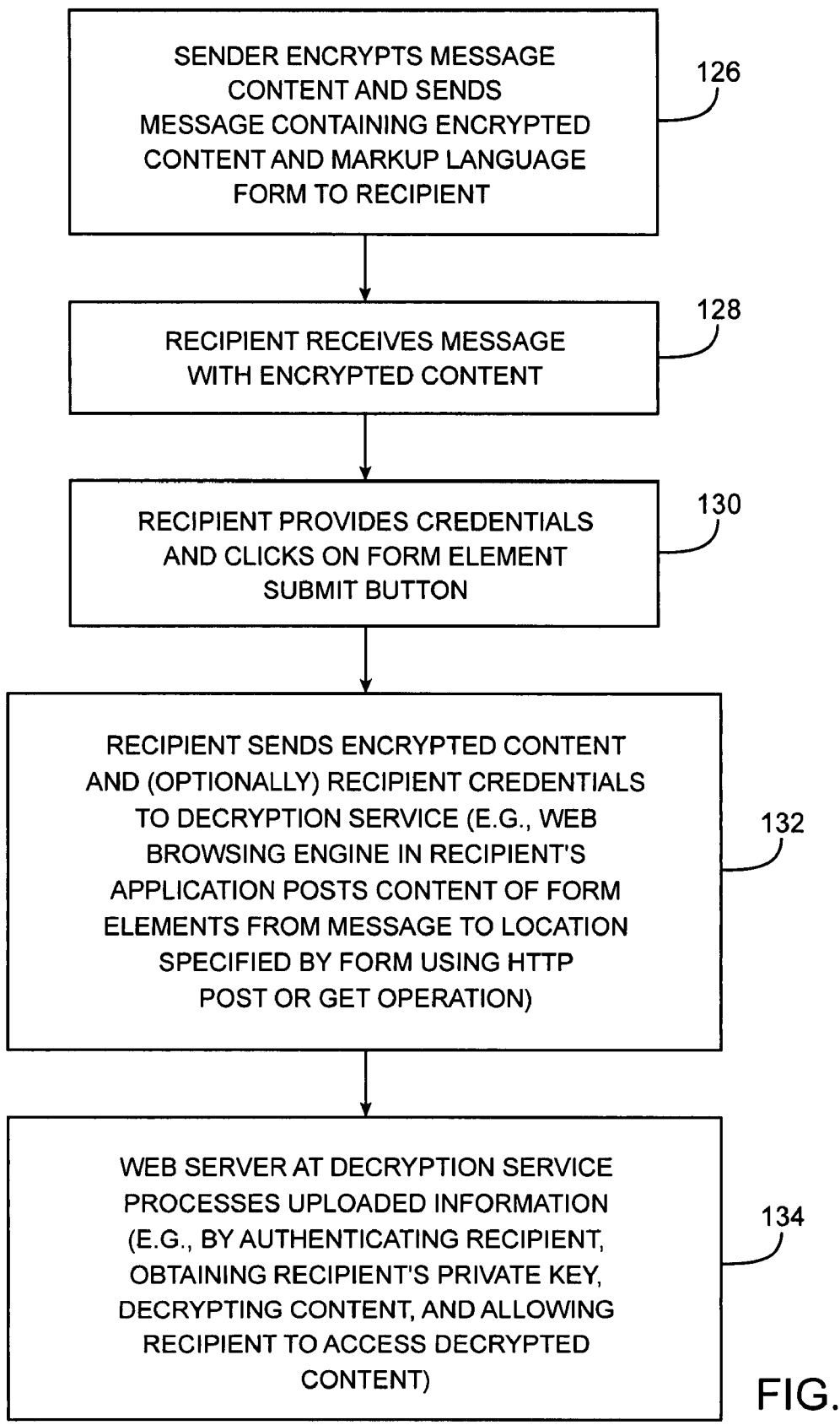
FIG. 7 is a flow chart of illustrative steps involved in using a markup language form arrangement of the type shown in FIG. 6 to decrypt content remotely in accordance with the present invention.

Illustrative steps involved in using a form-based arrangement of the type shown in FIG. 6 to provide recipients with remote decryption services in system 10 are shown in FIG. 7. At step 126, the sender encrypts message content for a desired recipient and sends the message to the recipient over network 14. The sender's messaging application 28 may use encryption engine 18 to encrypt message content using the IBE public key or PKE public key of the recipient. The messaging application may embed a form in the message to the recipient. The messaging application may place the encrypted content into a form element of the form such as form element 116 of FIG. 6. Other form elements such as recipient credential collection form elements 114 and decryption upload option 118 may also be incorporated into the message automatically by the sender's messaging application.

The recipient may receive the message containing the form at step 128. The recipient may use a web browser, an email program with an appropriate forms-handling engine such as a web browser engine that handles html forms or any other suitable application to display the received message.

At step 130, the recipient may fill in recipient credential information form elements with appropriate recipient credential information or may otherwise provide credentials, if desired. The encrypted message content has already been automatically embedded in the form as a form element by the sender, so the recipient need not be concerned with locally saving the message for later attachment and uploading to the decryption service. Rather, the recipient can simply click on form element button 118.

When the recipient clicks on form element 118 (FIG. 6), the web browser engine of the recipient's email program or other suitable forms-handling component of the recipient's application sends the encrypted content from the embedded form element 116 and (if desired) recipient credential information from form elements such as elements 114 to the decryption service. The location of the decryption service (i.e., the web address of a web server operating at the decryption service) may embedded in the form 112 for use by the recipient's application in locating the decryption service when decryption option form element 118 is selected by the recipient. An http POST or GET operation or other suitable operation may be used to post the content of the form elements to the web location specified by the form (i.e., to the decryption service).

At step 134, the web server at the decryption service 22 receives and processes the uploaded information from the recipient. For example, the web server at the decryption service 22 may use recipient credential information to authenticate the recipient. Using the recipient credential information and/or other information such as information identifying the recipient, the decryption service can request an appropriate private key for use in decrypting the message from private key service 24. The private key may be used to decrypt the uploaded encrypted message content. Any suitable technique may then be used to provide the recipient with access to the decrypted content of the message. For example, the decrypted content may be displayed on a web page, may be downloaded when the recipient selects a "download" option or URL that is provided on a web page, may be streamed to the recipient in real time, etc.

Many email applications are configured so that html forms cannot be displayed in the body of a message. In an organizational environment, this type of configuration is preferred for enhanced network security. Network users are less likely to inadvertently divulge sensitive information if their email programs do not display forms.

To accommodate environments in which forms that are contained in the body of a message are not displayed by the recipient's messaging application 28, senders may generate messages in which forms are provided as attachments, rather than being provided directly in the message body.

Figure 8:
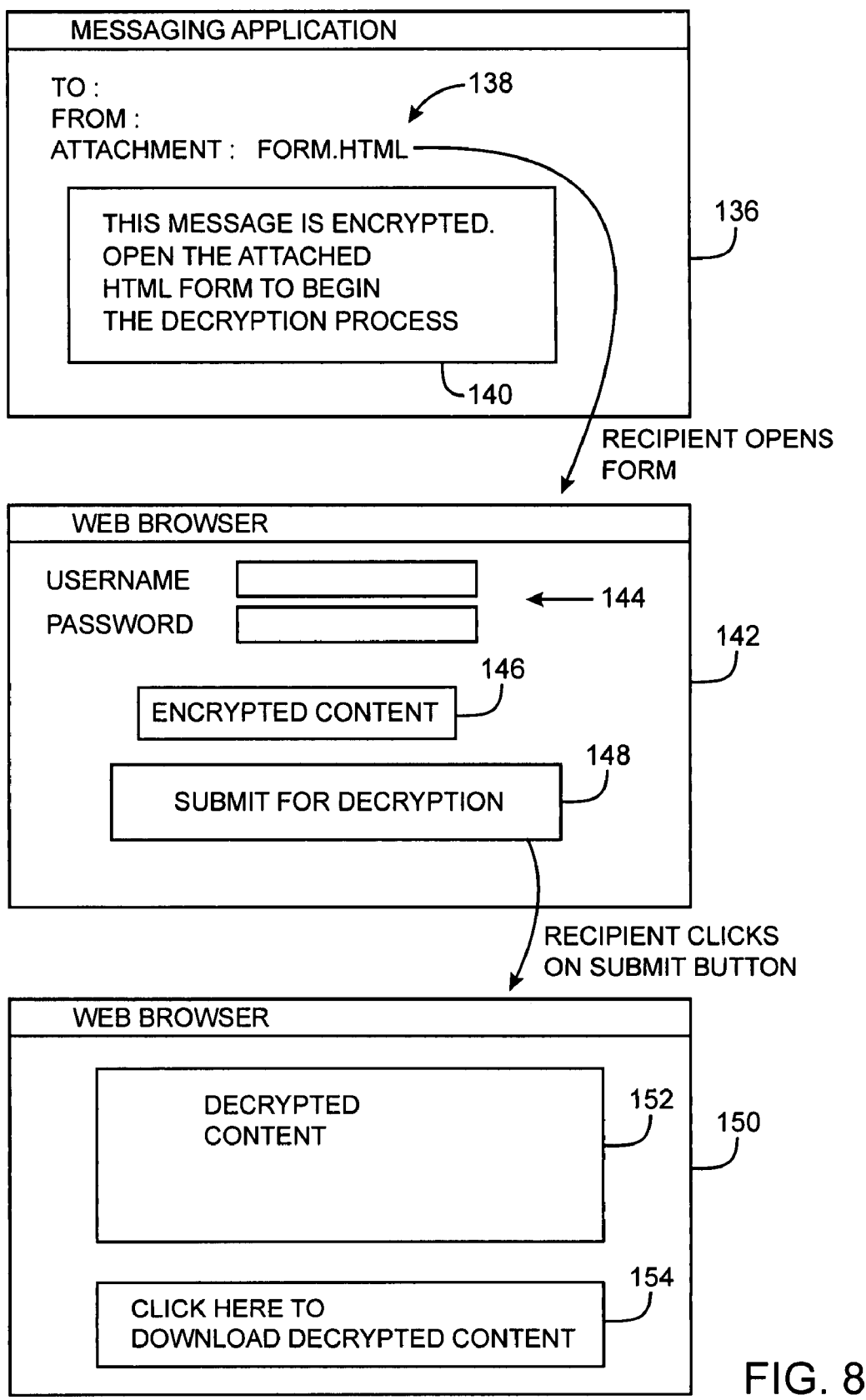
FIG. 8 is a diagram showing how a form attachment may be attached to a message to assist a user in uploading encrypted content for remote decryption in accordance with the present invention.

An illustrative arrangement of this type is shown in FIG. 8. As shown in FIG. 8, a message having a form as an attachment may be provided in a display screen 136 for the recipient by the recipient's regular messaging application 28. The message screen 136 may be, for example, an email display screen that is provided by the recipient's email program. Although the forms capabilities of the email program have been disabled (in this example), the recipient is able to display the body of the message and its attachments —i.e., form 138.

The form attachment 138 in the example of FIG. 8 is an html form called "form.html." In general, any suitable type of form may be provided as an attachment. For example, the attached form may be a markup language form that uses a markup language other than html or may be a form based on a scripting language such as JavaScript. These are merely illustrative examples. A form based on any suitable language may be attached to the message if desired.

The body of the message displayed in screen 136 may contain header information and information such as instructions 140. The instructions may inform the recipient that the message contains encrypted content. The instructions may also direct the recipient to open the form attachment 138 to proceed with the decryption process. To assure the recipient that it is safe to open the form, the message may contain information such as a trusted logo that helps to identify the sender of the message to the recipient.

The recipient can open form 138 by right-clicking on the form and selecting an "open" option or by using any other suitable approach supported by the recipient's operating system and applications. When the form is opened, an application 28 that is capable of handling forms such as a web browser is automatically launched on the recipient's equipment 12.

The web browser that is launched displays the form to the recipient. The form may, for example, appear as shown in illustrative display screen 142. The form of screen 142 may be the same type of form used in connection with the form-based arrangement of FIGS. 6 and 7. Recipient credential information may be collected using form elements 144 (if desired). Encrypted message content may be provided in a form element 146. The form element 146 may be hidden to reduce visual clutter. The displayed form 142 may also contain an option such as submit for decryption option 148 (which may be provided as a form element).

When the recipient clicks on option 148, the encrypted content from element 146 is posted to the location identified by the form (i.e., to a web server at the decryption service 22). The decryption service uses the posted information to authenticate the recipient and obtain the private key of the recipient. The decryption service then decrypts the encrypted content of the message that was contained in encrypted content form element 146.

Once the content of the encrypted message has been decrypted by the decryption service, the decryption service can provide the recipient with access to the decrypted version of the message content. Any suitable approach may be used to provide the recipient with access to the decrypted content. For example, the decrypted content may be displayed in the same web browser widow that was used to display the form of screen 142. As shown in FIG. 8, a screen such as screen 150 may be displayed in the recipient's web browser. Screen 150 may include the decrypted content 152 (e.g., the decrypted text of the message) and/or options such as option 154 that the recipient can select to begin the process of downloading the decrypted content. Option such as option 154 may be provided using graphics (e.g., in the form of a clickable button) or may be provided using URLs. In general, any of the illustrative techniques that have been described in connection with decrypted content access approaches of FIGS. 4-7 may be used with the form attachment technique of FIG. 8.

Figure 9:
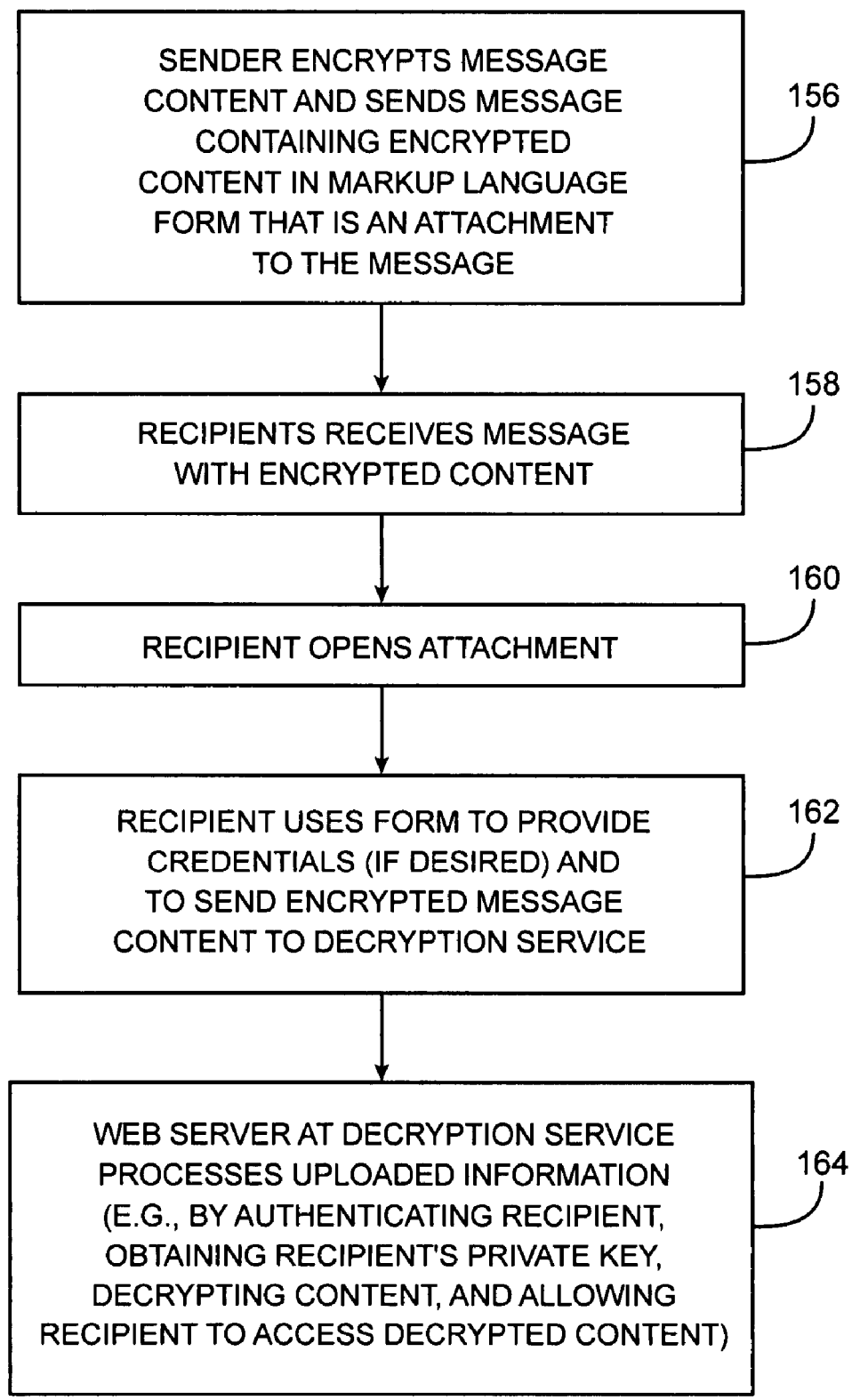
FIG. 9 is a flow chart of illustrative steps involved in using a markup-language form arrangement of the type shown in FIG. 8 to remotely decrypt encrypted content in accordance with the present invention.

Illustrative steps involved in using the form attachment technique of FIG. 8 to support secure messaging in system 10 are shown in FIG. 9. At step 156, the sender may use a messaging application to encrypt a message for a desired recipient and to send the message to the recipient over network 14. Message content may be encrypted using encryption engine 18 (e.g., using IBE encryption or PKE encryption).

The recipient to which the message is addressed may be a recipient at a location in which email applications and other messaging applications are not able to display forms contained in the body of a message. To accommodate this restriction, the messaging application 28 that is used by the sender automatically attaches a suitable form to the message, rather than including the form in the message body. The form that is attached to the message contains the encrypted message content and form elements that (optionally) allow the recipient to submit recipient credential information to decryption service 22. The encrypted message content may be provided as a hidden form element. The form attachment may also include a decrypt option form element that the recipient can select to initiate the remote decryption process at decryption service 22. Instructions and other content may also be included in the message. For example, unencrypted instructions that instruct the recipient to open the attached form may be included in the message body.

At step 158, the recipient may receive the encrypted message from the sender. The recipient may be, for example, a recipient such as recipient B who does not have a local decryption engine 20. The recipient may also not be able to view forms that are contained directly in the body of an email message. However, the recipient's messaging application is capable of accepting and listing forms that are provided as attachments, so the form provided by the sender is listed as an attachment in the display screen provided by the recipient's email program.

At step 160, the recipient may open the form attachment. Any suitable application may be used to display the opened form. For example, a web browser may be used to open and display an html form.

After opening the attachment, the recipient may use the form to provide recipient credential information (if desired) and the encrypted message contents to the decryption service at step 162. The location of the decryption service may be specified in the form (e.g., as a web address). The uploading of the recipient credential information and encrypted message content for decryption may be initiated by the recipient by clicking on a form element option such as a "submit for decryption" option provided in the opened form.

At step 164, the web server at the decryption service that received the uploaded information from the form processes the uploaded information. For example, the recipient can be authenticated using uploaded recipient credential information, a corresponding private key can be obtained from private key service 24, and the uploaded encrypted content can be decrypted (using the private key and decryption engine 20 at the decryption service 22). The recipient can be provided with access to the decrypted version of the encrypted message content using any suitable technique (e.g., by displaying the decrypted content in the recipient's open web browser window, by allowing the recipient to click on a URL or other option that initiates a downloading and storage process, etc.). Decrypted content may be provided to the recipient over an SSL or TLS link or other secure link to maintain message secrecy.

If desired, the sender's messaging application can be used to create and attach multiple encrypted files to a message. An advantage of splitting up encrypted content into multiple attachments is that the recipient need not submit all of the attachments for decryption at once. Only those attachments that the recipient desires to decrypt need be decrypted by the decryption service. This approach is particularly helpful when sending a number large attachments, because when many large attachments are combined into a single file, the file may become undesirably large.

With one suitable approach, the messaging application 28 of the sender allows the sender to decide whether to combine content into a single html form (or other suitable form) or whether to split some or all of the message content into separate html forms (or other suitable forms). The message content may then be encrypted using the public key of the recipient using an IBE or PKE encryption engine 18 at the sender and the IBE or PKE public key of the recipient.

Content that has been encrypted may be embedded into the forms as form elements (e.g., hidden form elements) by the sender's application. For example, if the content to be encrypted includes message body text, a video file, and an audio file, three forms may be created—a first form in which the encrypted body text is embedded as a hidden form element, a second form in which the encrypted video file is embedded as a hidden form element, and a third form in which the encrypted audio file is embedded as a hidden form element.

Figure 10:
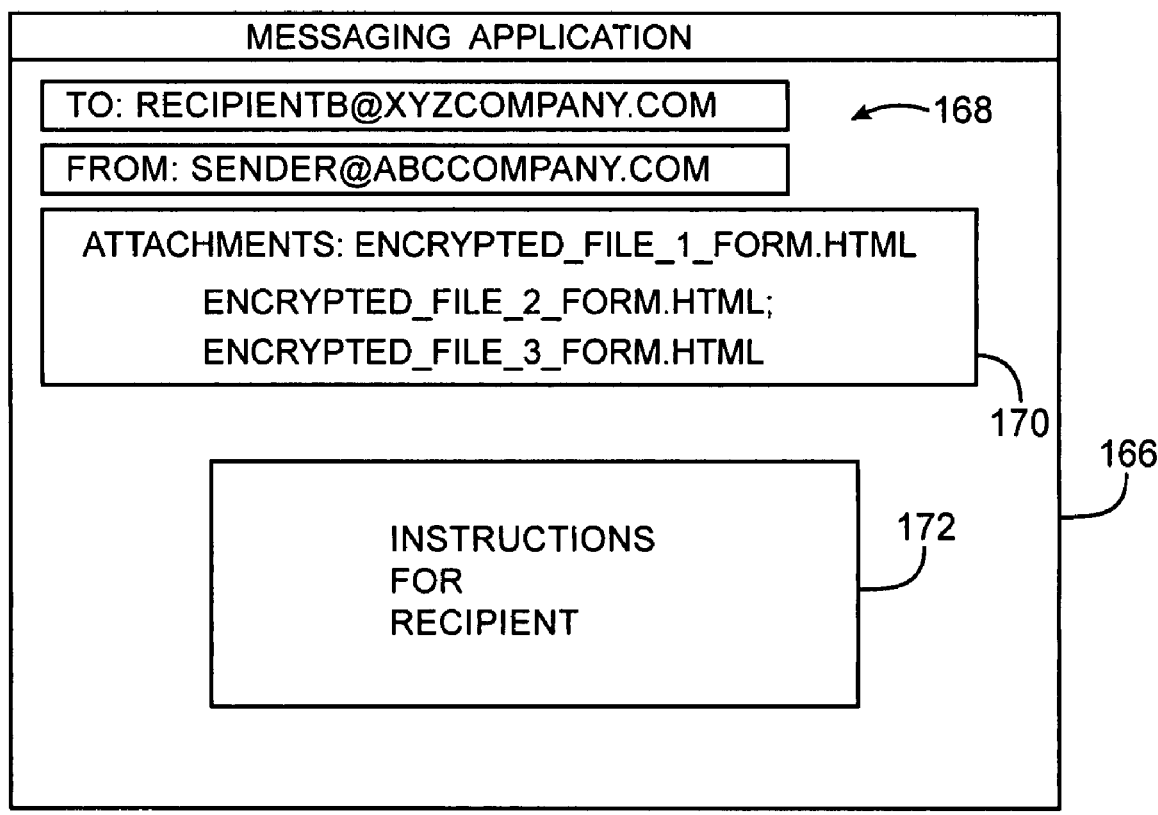
FIG. 10 is a diagram showing how encrypted content may be provided as multiple markup language form attachments in accordance with the present invention.

An illustrative message that has been constructed using this approach is shown in FIG. 10. When the message is received by the recipient, a messaging application or other suitable application 28 at the recipient can display the message in a display screen such as display screen 166 of FIG. 10. Header information 168 may be displayed in the message that includes information on the sender's address and the recipient's address. The message may also contain a list 170 of the message's attachments. In the example of FIG. 10, there are three html form attachments: encrypted_file_1_form.html, encrypted_file_2_form.html, and encrypted_file_3_form.hthm. This is merely illustrative. Any suitable number of forms may be provided with a message by the sender's messaging application 28.

The process of selecting which files to include in the message as separate form attachments and which files to incorporate into the same form attachment may be handled under the manual control of the sender and/or the automated control of the messaging application. For example, the messaging application may automatically combine small attachments and may automatically separate out large attachments during the message creation process or the sender may be allowed to select which files are provided in each form.

Messages such as the message of FIG. 10 may include instructions for the recipient 172. The instructions may provide the recipient with information on the identity of the sender. The instructions may also inform the recipient that the message contains encrypted content and that the recipient should open the attached forms to begin the remote decryption process. As each form is opened by the recipient, the recipient may be presented with a screen such as screen 142 of FIG. 8. The recipient can enter their recipient credentials (if recipient credential information is requested) and can submit the encrypted content that is embedded in the form to the decryption service 22 by clicking on a remote decryption option such as the submit for decryption option 148 of FIG. 8.

After the decryption service 22 has received and decrypted the uploaded content, the recipient can be provided with access to the decrypted version of the content. An approach of the type described in connection with screen 150 of FIG. 8 or any other suitable approach may be used to provide the recipient with access to the decrypted content.

When multiple forms are attached to a message, each form may contain the recipient credential information form elements for gathering username and password information from the recipient (or other suitable recipient credential information). If desired, recipient credential information need only be collected in one of the forms (e.g., one of the forms with encrypted content or a separate "log-in" form). Once the recipient has been authenticated by the decryption service, the recipient can be logged in to the decryption service for the duration of a decryption session (i.e., until the recipient logs out or breaks the connection with the decryption service 22). During this decryption session, the recipient can be allowed to use the other forms to upload content for decryption without entering the recipient credential information again.

The use of attached html forms to provide encrypted content to recipients ensures that recipients in restrictive environments can receive and access encrypted message content. To enhance the user experience for recipients such as recipient A of FIG. 1, encrypted content may also be incorporated into the body of the message. Recipients such as recipient B of FIG. 1 do not have local decryption capabilities, so the encrypted message body content will appear as encrypted cyphertext to those recipients. However, recipients such as recipient A, who operate in less restrictive environments, and who have decryption engines 20 on their equipment 12, will be able to decrypt and view the encrypted message body content without using the form attachments.

A sender may not know which type of environment a given recipient is operating in, so the inclusion of two copies of certain message content in the message by the sender's messaging application may help the sender accommodate both types of recipient. The messaging application may encrypt a first copy of certain content and place it into the body of the message. A second copy of this content may be encrypted and placed into a form as a hidden form element. The form may then be attached to the message. Recipients such as recipient A can decrypt the first copy of the content locally using decryption engine 20. Recipients such as recipient B can open the form attachment and submit the encrypted content to decryption service 22 for remote decryption.

Figure 11A:
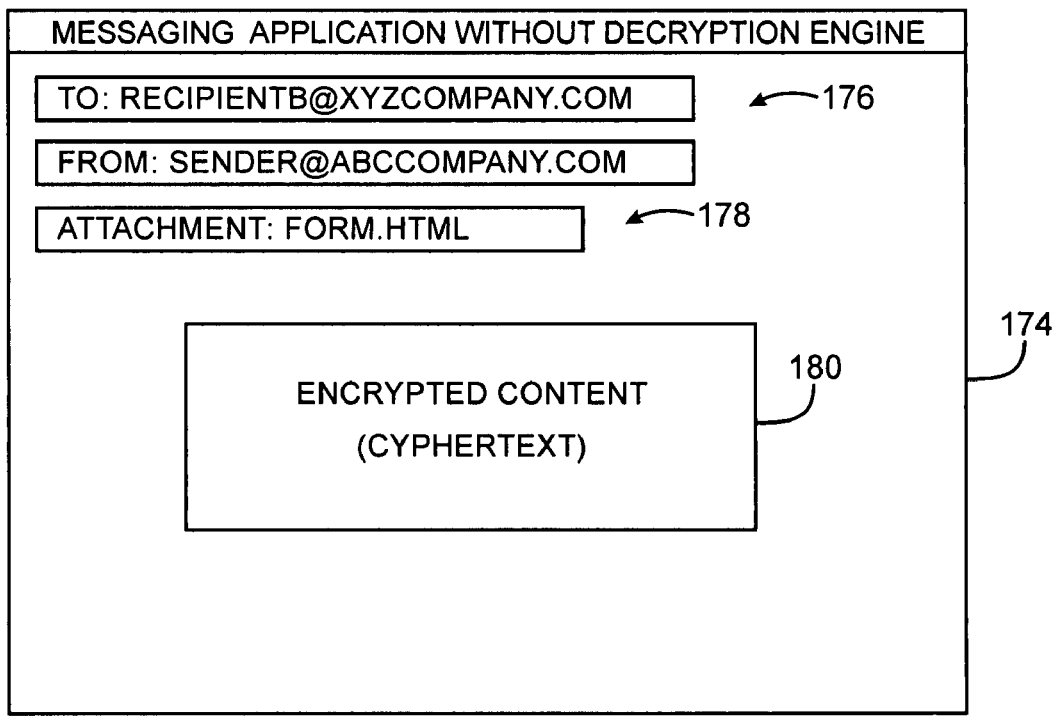
FIG. 11a shows how a messaging application without a local decryption engine can display an encrypted message with encrypted body text in accordance with the present invention.
Figure 11B:
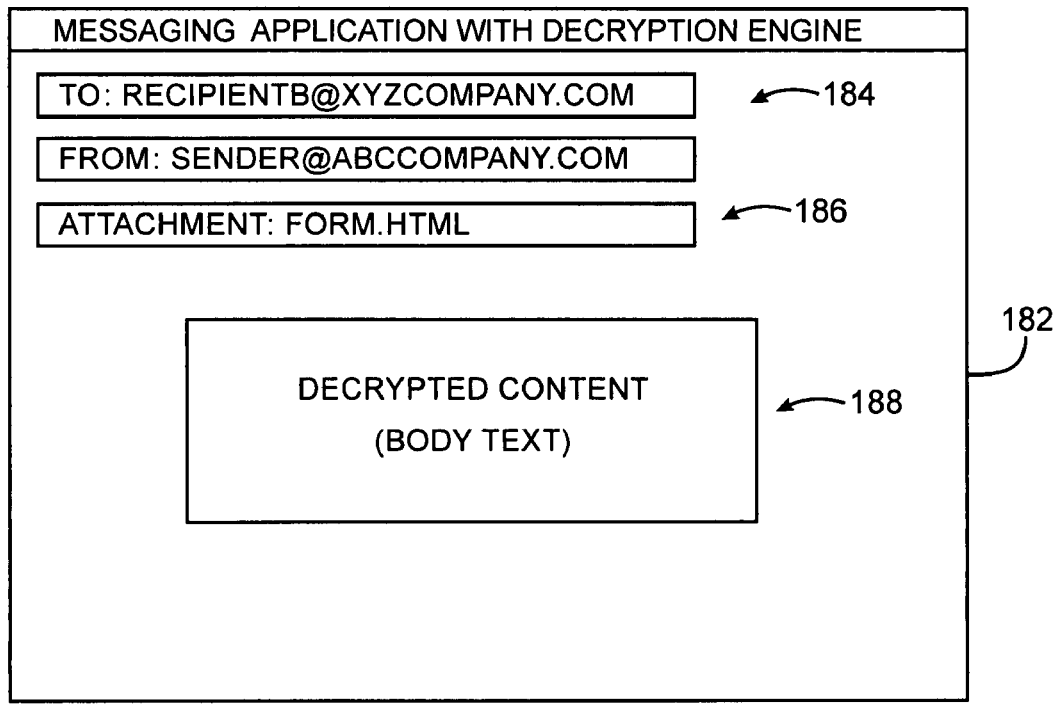
FIG. 11b shows how a messaging application with a local decryption engine can display decrypted content from an encrypted message of the type shown in FIG. 11a in accordance with the present invention.

The content that is duplicated in this way may be any suitable message content. For example, the replicated content may be certain message body text. An illustrative message that has certain message text provided as both encrypted text in the message body and as an encrypted form element in an attached html form is shown in FIGS. 11a and 11b.

A recipient such as recipient B (FIG. 1) may use a messaging application without a decryption engine 20 to display the message. In this situation, the messaging application of the recipient displays the message in a screen such as screen 174 of FIG. 11a. As shown in FIG. 11a, the message may contain header information 176. The message may also contain instructions for the recipient and a list 178 of attachments. The attachments may include one or more forms. In the example of FIG. 11a, a form called form.html is provided as an attachment. When the recipient opens form.html, the recipient is provided with an opportunity to provide recipient credentials and an opportunity to initiate remote decryption of embedded encrypted content using decryption service 22. Because the messaging application without the decryption engine is not able to locally decrypt encrypted content, the body of the message 180 in screen 174 is still encrypted. The encrypted text appears in code—(e.g., as cyphertext such as "u09j5i9mkld90n. . . . "). Although the message body text cannot be decrypted locally, the instructions in the message can inform the recipient that the entire contents of the encrypted message is available for viewing provided that the recipient uses the form decryption technique.

A recipient such as recipient A (FIG. 1) may use a messaging application with a decryption engine 20 to display the same message. In this situation, the messaging application of the recipient displays the message in a screen such as screen 182 of FIG. 11b. As shown in FIG. 11b, the message may contain header information header information 184. The message may also contain instructions for the recipient and a list 186 of attachments. The messaging application on recipient A's equipment has a decryption engine 20. The messaging application may be, for example, an email program with a built-in decryption engine 20 or an email program with a decryption engine plug-in module.

The messaging application uses the decryption engine 20 to locally decrypt the message body text and to display this decrypted content 188 in screen 182. Additional form attachments may be used to support remote decryption of attached content or additional (non-form) encrypted attachments may be decrypted locally.

It may not be efficient to provide large amounts of content as both part of the message body (for recipients like recipient A) and as form attachments (for recipients like recipient B). Efficiency can be improved by providing encrypted content only once—as an html form (or other suitable file type).

This type of scheme may be implemented using a document handler application. Recipients such as recipient A who can install decryption software on their equipment 12 can use the document handler application on their equipment to automate the decryption process. When a message is received containing an attached html form with encrypted content, the recipient can open the html form as usual. When the form is opened, the document handler application automatically determines whether or not the form contains encrypted content. If the message contains encrypted content, the document handler application can invoke the decryption engine so that content is decrypted locally and presented to the recipient automatically without displaying form elements related to recipient credential collection and submission of the message for remote decryption.

Recipients such as recipient B who have not installed decryption software on their equipment do not need to use the document handler application. When these recipients open an attached html form with encrypted content, they may be presented with form-based options for entering recipient credential information and form-based elements for initiating remote decryption.

The document handler application may be set up on the equipment of a recipient such as recipient A using any suitable approach. For example, each time the recipient's messaging application 28 is run for the first time after a system reboot (or at any other suitable time), the messaging application may instruct the recipient's operating system to invoke the document handler application each time an html file (or other suitable file type) is opened. During this set-up process, the document handler application may be registered in the operating system. The recipient's messaging application may be an email program with decryption capabilities such as an email program with a decryption engine plug-in or a built-in decryption engine or may be any other suitable application for displaying messages.

After the operating system has been properly instructed regarding the use of the document handler application, every time an html file is opened the document handler application determines whether or not the file contains encrypted content (e.g., whether an html form that is being opened contains encrypted message content in the form of an embedded form element). If the document handler application determines that the file being opened is a regular (unencrypted) html document, the document handler application directs the recipient's web browser or other suitable program to open the html document as it would any regular html document. If, however, it is determined that the file being opened contains encrypted content, the document handler application can ensure that the decryption engine 20 is used to decrypt the encrypted content. The decrypted version of the content can then be presented to the recipient (e.g., using an application 28 suitable for displaying that type of content). If the decrypted content is in the format of a message, an appropriate message reader application may be invoked to display the decrypted message contents. If the decrypted content is in another format (e.g., a format associated with a particular application such as a spreadsheet, video file, image file, audio file, etc.), then an application that is capable of handling that file type can be automatically invoked and used to display the decrypted content.

The use of the document handler application can ensure that encrypted content is handled in a way that is well suited to the recipient's environment. Recipients who open encrypted mail attachments in environments in which a local decryption engine 20 is available may be directly presented with decrypted content. Recipients who open the same encrypted mail attachments in restrictive environments that do not have a local decryption engine 20 will be provided with a form that allows them to upload recipient credential information and encrypted content for remote decryption. Because decrypted content can be provided to recipients in environments with decryption engines 20 without incorporating any cyphertext into the body of a message, it is not necessary to duplicate content in both the attachment and the message body as described in connection with FIGS. 11a and 11b.

Figure 12A:
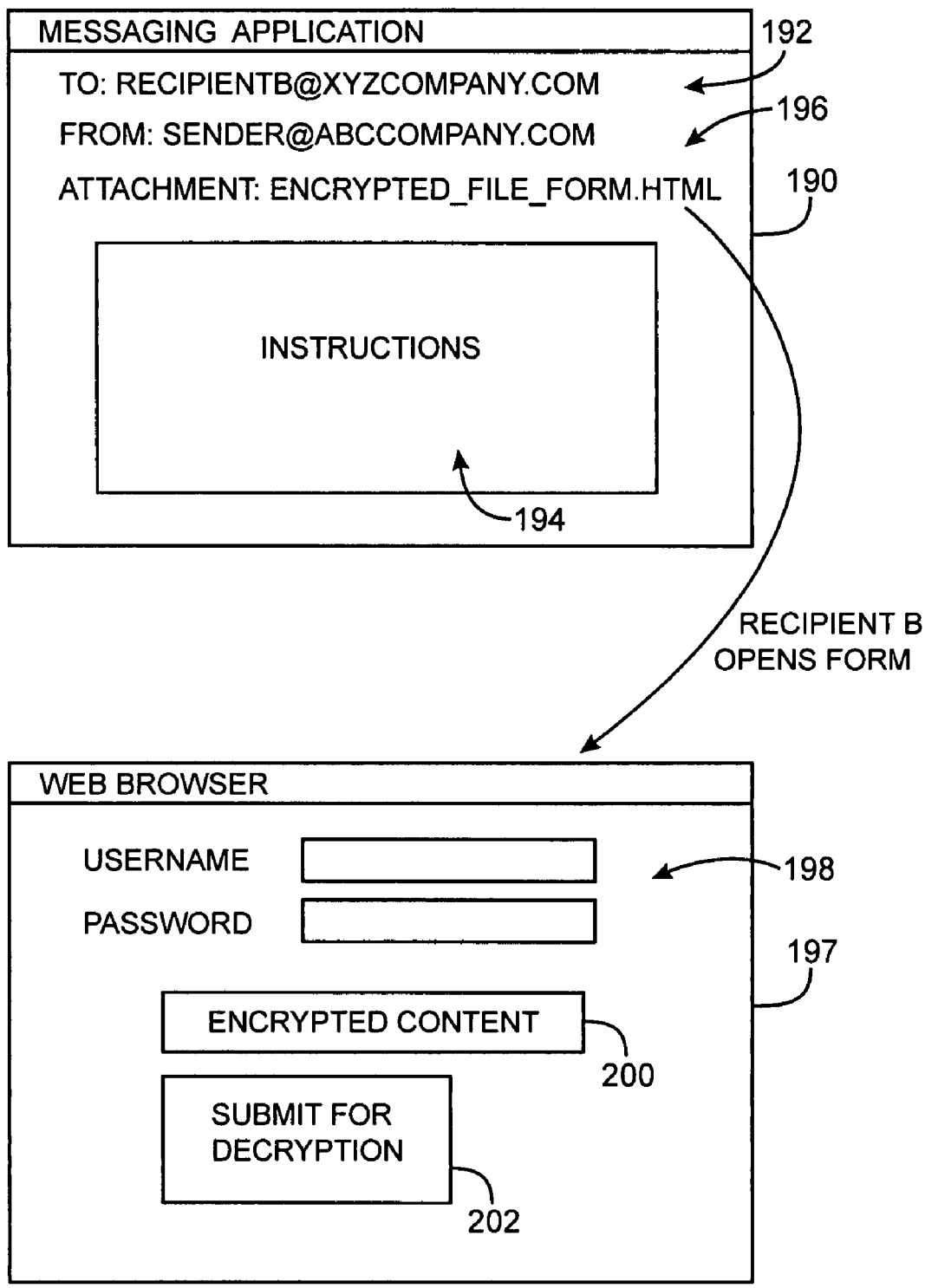
FIG. 12a shows how a recipient who opens a markup-language attachment to a message can be provided with a markup language form that assists the recipient in submitting encrypted content from the message for remote decryption in accordance with the present invention.
Figure 12B:
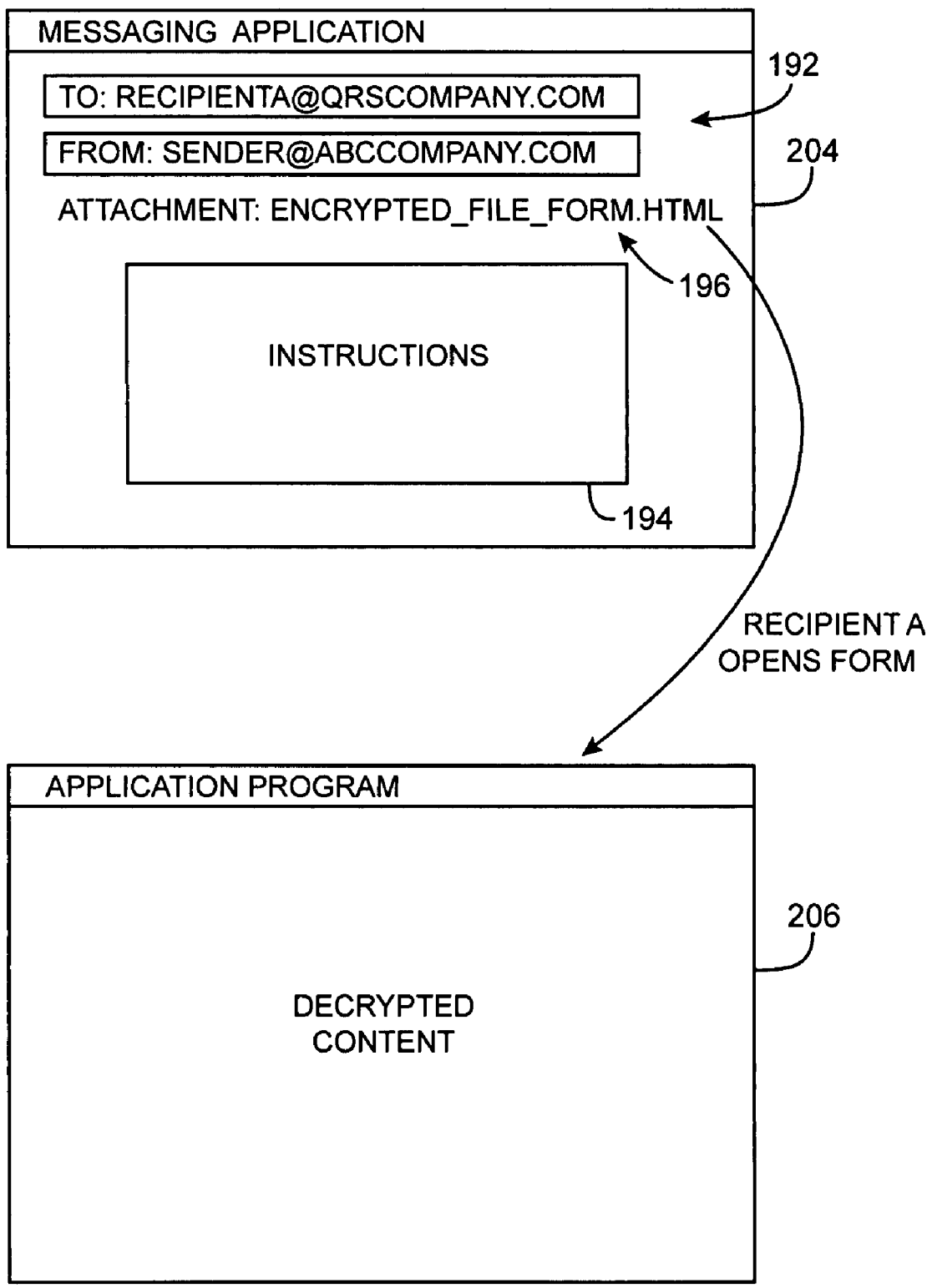
FIG. 12b shows how a recipient who receives an encrypted message of the type shown in FIG. 12a can use local application software to display the decrypted content automatically when the local application software has access to a local decryption engine in accordance with the present invention.

The use of a document handler application in a system 10 in which encrypted content is placed in forms that are included in messages as message attachments is illustrated in FIGS. 12a and 12b. The way in which a message is processed by a recipient without a local decryption engine is shown in FIG. 12a. Message processing by a recipient who has a decryption engine 20 and where the operating system has been instructed to invoke an appropriate document handler application when forms are opened is shown in FIG. 12b.

Initially, a sender creates a message with encrypted content using a messaging application on the sender's equipment. An encryption engine 18 may be used to encrypt the message content using the IBE public key or PKE public key of the recipient. The messaging application may place encrypted content into a form. The form may be an html form or other markup language form or any other suitable type of form. The encrypted content may be embedded in the form as a form element. The form element may be hidden to reduce visual clutter. If it is desired to collect recipient credential information using fillable boxes or other appropriate user interface, username and password form elements or other suitable structures may be included in the form by the sender's messaging application. Instructions may be included in the message (e.g., as unencrypted message body text). If there are large amounts of content to be encrypted or if there are a number of different files associated with the message, multiple forms may be attached to the message. After the sender has created the encrypted message, the message may be sent to a recipient over network 14. The sender need not know whether or not the recipient has an installed decryption engine on their equipment.

A recipient such as recipient B of FIG. 1 who is operating in a restrictive environment or who does not wish to install a decryption engine locally for other reasons, may be presented with a display screen such as screen 190 of FIG. 12*a* upon receipt of the message. The recipient's messaging application (e.g., the recipient's email program) or other recipient application (e.g., a web browser) may be used to display screen 190 for the recipient.

The message may include header information 192. Instructions 194 may be included in the message that inform the recipient that the message has been encrypted. Information on the sender (e.g., a logo or other such information) may also be included in the message. The message may have a list 196 of message attachments or other suitable message attachment information. The instructions 194 may direct the recipient to open an attached form to decrypt and view the contents of the message.

When the recipient opens the form, the recipient's web browser (or other application with a suitable web engine) may be launched and may display a screen for the recipient such as screen 197. The form displayed in screen 197 may have form elements 198 for collecting recipient credential information or recipient credential information may, if desired, be collected using other suitable techniques. The encrypted content of the message may be embedded in the form as a form element 200 (e.g., a hidden form element). The form can have additional instructions for the recipient. The recipient can follow these instructions to decrypt the encrypted content remotely. For example, the recipient can click on a decryption button such as decryption form element button 202 to initiate the uploading of the recipient credential information from elements 198 and the encrypted content of element 200 to the decryption service. The decryption service 22 can decrypt the uploaded encrypted content and provide the recipient with access to the decrypted content as described in connection with FIG. 8.

When the same message is sent to a recipient such as recipient A of FIG. 1, the message is treated differently. A recipient such as recipient A of FIG. 1 operates in an environment in which an email plug-in with decryption capabilities or other decryption-capable application 28 has been installed on the recipient's equipment. The operating system on this recipient's equipment has also been instructed to invoke the document hander application whenever an html form (or other suitable document type) is opened.

When the message is received by recipient A, the recipient's messaging application may display the message for the recipient in a screen such as screen 204 of FIG. 12*b*. Screen 204 may contain the same information as screen 190 of FIG. 12*a*. For example, the message in screen 204 may include the same header information 192, the same instructions 194, and the same list 196 of attachments. However, recipient A's equipment handles message attachments differently than recipient B's equipment.

In particular, when recipient A opens the encrypted file attachment (i.e., the form "encrypted_file_form.html" in the example of FIG. 12*b*), the document handler application is invoked by recipient A's operating system. The document hander application determines whether the form contains encrypted content. If the form contains encrypted content, the decryption engine 20 is run locally to decrypt the encrypted content. The decrypted content may then be automatically presented to the recipient in a screen such as screen 206. Screen 206 may be displayed by the recipient's messaging application or other application program that is appropriate for displaying a decrypted file attachment of the type that has been decrypted (e.g., a video or image file, a word processing document, a spreadsheet, etc.).

Figure 13:
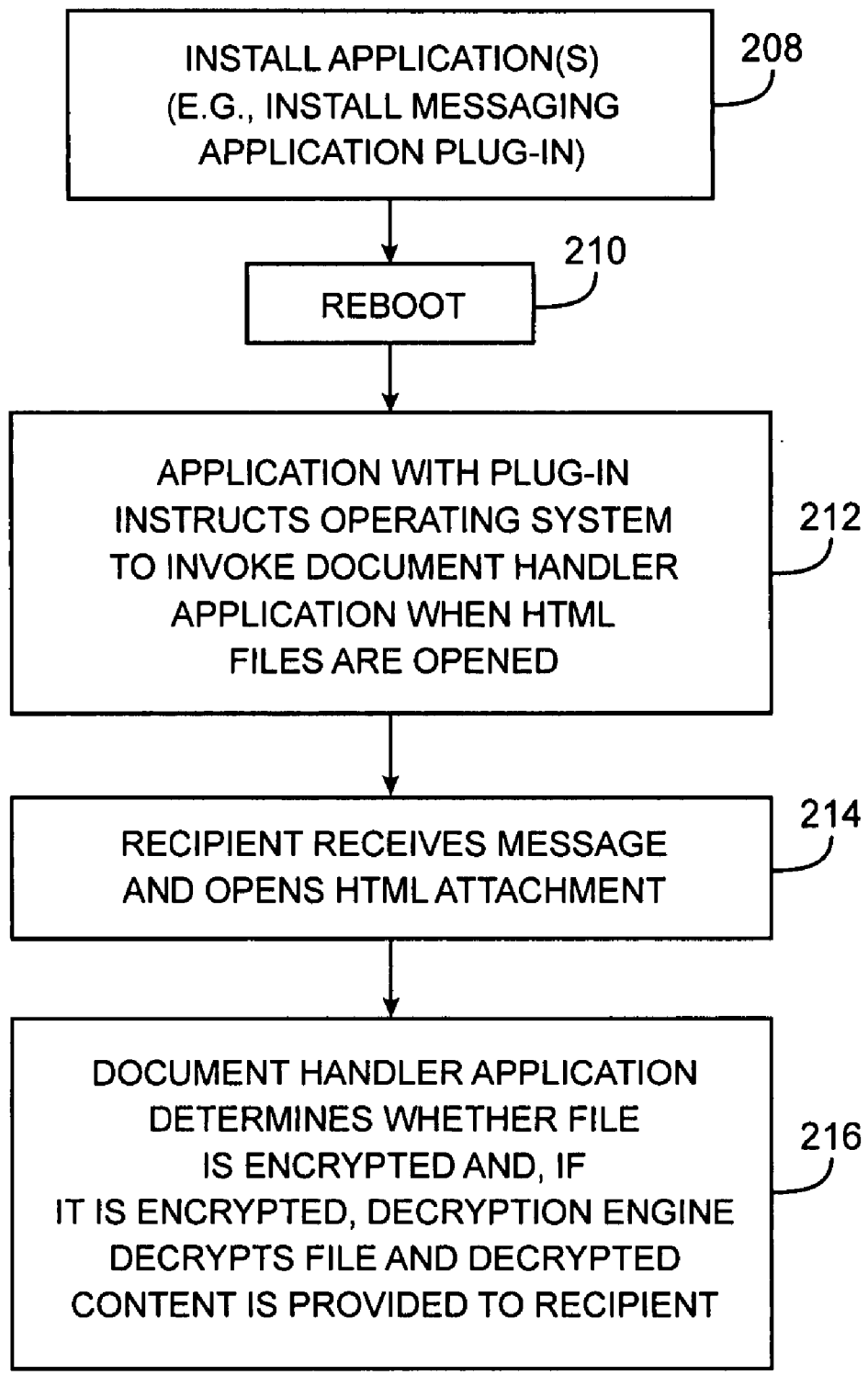
FIG. 13 is a flow chart of illustrative steps involved in setting up and using a recipient's equipment so that encrypted message attachments are decrypted locally in accordance with the present invention.

Illustrative steps in using a document handler application in system 10 to automatically decrypt encrypted content for certain recipients are shown in FIG. 13.

At step 208, a decryption engine 20 may be installed on the equipment of recipient A (FIG. 1). The decryption engine may be, for example, a decryption engine plug-in for an email program. Other application programs may also be installed on the equipment of recipient A and the equipment of recipient B (FIG. 1).

To ensure proper handling of encrypted documents at recipient A, the operating system on the equipment of recipient A is instructed to invoke a document handler application each time a particular type of document such as an html form is opened. Recipient A's operating system may be instructed in this way at step 212 following a reboot operation (step 210). Recipient A's operating system may be instructed to use the document handler application by recipient A's messaging application, an installation program, or any other suitable process.

At step 214, recipient A may receive a message from a sender and may open an html form that is attached to the message.

At step 216, the document handler application may determine whether the html form that is being opened contains encrypted content. If encrypted content is detected, the decryption engine 20 at the recipient may be used to decrypt the encrypted content. The recipient may then be provided with access to the locally-decrypted content. Recipients such as recipient B who open the same form can use the form to initiate remote decryption by decryption service 22.

Some organizations may use software such as antispam or antivirus filtering software that blocks html forms. When a recipient in this type of organization receives a message to which a sender attached an html form, the attachment may be missing. Recipient's in these organizations cannot use a form-based approach for initiating remote decryption of encrypted content. Such a recipient may, however, request retransmission of the encrypted message in a format the circumvents restrictions on the use of forms or all messages may be provided using such a format.

One illustrative way in which to circumvent potential restrictions on the use of html forms involves embedding encrypted content into the message in GIF image tags. GIF image tags are widely used in web pages and other html content (e.g., html email). As a result, GIF image tags are generally not blocked by antispam and antivirus filtering packages.

With a GIF-based encryption approach, the sender's messaging application first encrypts the content to be protected using the IBE public key or PKE public key of the recipient.

The encrypted content appears as a block of cyphertext. As an example, the encrypted content might be "xmoejoapui9f0aeujf9ejfia. . . . . ").

After the cyphertext has been generated at the sender, the sender's messaging application breaks the cyphertext into pieces (e.g., 1000 byte pieces). The sender's messaging application may also assign the message a unique message identifier (msgID). Each piece of cyphertext can be embedded in a separate GIF tag (e.g., a GIF tag associated with a small 1×1 pixel GIF) with the unique message ID and a part identifier (i.e., a number that identifies which subpart of the message the code fragment in the GIF tag corresponds to). Each GIF tag may also include the web address of an appropriate web server at the decryption service 22.

In the present example, the first few GIF tags might appear as follows:

```
GIF1 = http://proxy.corp.com/msgID=17/part=1/xmoejoap
GIF2 = http://proxy.corp.com/msgID=17/part=2/ui9f0aeu
GIF3 = http://proxy.corp.com/msgID=17/part=3/jf9ejfia
```

When the recipient receives and views a message containing the embedded GIF tags, the GIF tag information is sent automatically to the decryption service 22. In particular, when processed normally by the recipient's web browser engine (e.g., the web browser used by the recipient to view html email received by the recipient's email program), each GIF image tag in the message will cause the web browser engine to send an associated GIF image request to the decryption service 22 over network 14 (i.e., the web server at service 22 that is specified by the address "proxy.corp.com" in this example). When this web server receives the GIF image requests, it may use the message identifier and piece identifier information to reconstruct the full cyphertext of the encrypted message from the pieces of cyphertext in the requests. The recipient can then click on a URL or other suitable option that takes the recipient to a web page where the recipient can provide recipient credential information. After authenticating the recipient, the decryption service can obtain the recipient's private key. The private key can then be used by the decryption engine 20 at the decryption service to decrypt the pieced-together cyphertext. The recipient can be provided with access to the decrypted version of the encrypted message content using any suitable technique, as described in connection with the form-based remote decryption arrangements.

The use of GIF image tags is merely illustrative. Cyphertext can be divided into small parts and automatically transmitted to a web server for remote decryption using any suitable arrangement. Moreover, this approach and the other approaches described above need not be mutually exclusive. Messages can be sent in system 10 that use a combination of these approaches for encrypting content.

If desired, senders who operate in restrictive system environments may also use remote services. For example, if a sender desires to send an IBE-encrypted or PKE-encrypted message to a recipient, but the sender is not able or does not desire to install a local encryption engine 18 on their equipment, the sender can securely transmit a message for encryption to a remote encryption service. The message can be sent securely by uploading the message to the remote encryption service over an SSL or TLS link or other secure communications path.

The remote encryption service may have an encryption engine 18. Upon receiving the uploaded message content, the remote encryption service can encrypt the message using the IBE public key or PKE public key of a desired recipient specified by the sender. The remote encryption service may then transmit the resulting encrypted message to the recipient over network 14. The recipient can decrypt the encrypted message content locally or using a remote decryption service.

The foregoing is merely illustrative of the principles of this invention and various modifications can be made by those skilled in the art without departing from the scope and spirit of the invention.

What is claimed is:

1. A method for providing recipients with access to message content in a system in which a sender sends a message having encrypted message content in at least one image tag to a recipient over a communications network, comprising:
   at the recipient, receiving the message that has the encrypted message content in the image tag;
   at the recipient, uploading the image tag including the encrypted message content to a remote decryption service over the communications network; and
   at the decryption service, decrypting the encrypted message content from the image tag and providing access to the decrypted message content to the recipient over the communications network.

2. The method defined in claim 1 further comprising:
   at the sender, placing the encrypted message content into a plurality of image tags; and
   at the sender, sending the plurality of image tags to the recipient in the message.

3. The method defined in claim 1 wherein the image tag comprises a GIF image tag, the method further comprising:
   at the sender, placing the encrypted message content into the GIF image tag; and
   at the sender, sending the GIF image tag to the recipient in the message.

4. The method defined in claim 1 further comprising:
   at the sender, placing the encrypted message content into a plurality of GIF image tags; and
   at the sender, sending the plurality of GIF image tags to the recipient in the message.

5. The method defined in claim 1 further comprising:
   at the sender, placing the encrypted message content into a plurality of GIF image tags; and
   at the sender, sending the plurality of GIF image tags to the recipient in the message, wherein each GIF image tag includes a message identifier that is associated with the message.

6. The method defined in claim 1 further comprising:
   at the sender, placing the encrypted message content into a plurality of GIF image tags; and
   at the sender, sending the plurality of GIF image tags to the recipient in the message, wherein:
      receiving the message at the recipient comprises receiving the plurality of GIF image tags in the message;
      uploading to the remote decryption service comprises uploading the plurality of GIF image tags in the message to the decryption service; and
      decrypting the encrypted message content comprises decrypting the encrypted message content from the plurality of uploaded GIF image tags.

7. The method defined in claim 1 further comprising:
   at the sender, encrypting the message content with an IBE public key to produce the encrypted message content;
   at the sender, placing the encrypted message content into a plurality of image tags;
   at the sender, sending the plurality of image tags to the recipient in the message, wherein:
      receiving the message at the recipient comprises receiving the plurality of image tags in the message;

uploading to the remote decryption service comprises uploading the plurality of image tags in the message to the decryption service; and decrypting the encrypted message content comprises decrypting the encrypted message content from the plurality of uploaded image tags.

8. The method defined in claim 1 further comprising:
at the sender, encrypting the message content with a PKE public key to produce the encrypted message content;
at the sender, placing the encrypted message content into a plurality of image tags;
at the sender, sending the plurality of image tags to the recipient in the message, wherein:
receiving the message at the recipient comprises receiving the plurality of image tags in the message;
uploading to the remote decryption service comprises uploading the plurality of image tags in the message to the decryption service; and
decrypting the encrypted message content comprises decrypting the encrypted message content from the plurality of uploaded image tags.

9. The method defined in claim 1 further comprising:
at the sender, encrypting the message content for the message with a public key to produce the encrypted message content;
at the sender, breaking the encrypted message content into pieces; and
at the sender, embedding each piece of the encrypted message content into a corresponding image tag with a unique message identifier, wherein the unique message identifier identifies the message.

10. The method defined in claim 1 further comprising:
at the sender, encrypting the message content for the message with a public key to produce the encrypted message content;
at the sender, breaking the encrypted message content into pieces; and
at the sender, embedding each piece of the encrypted message content into a corresponding image tag with a message part identifier that identifies that piece; and
at the decryption service, using the message part identifiers associated with the pieces of the encrypted message content to reconstruct the encrypted message.

11. The method defined in claim 1 further comprising:
at the sender, encrypting the message content for the message with a public key to produce the encrypted message content;
at the sender, breaking the encrypted message content into pieces; and
embedding each piece of the encrypted message content into a corresponding image tag with a unique message identifier and a message part identifier, wherein the unique message identifier identifies the message to which that piece of the encrypted message content belongs and wherein the message part identifier identifies that piece of the encrypted message content.

12. The method defined in claim 1 further comprising:
at the sender, encrypting the message content for the message with a public key to produce the encrypted message content;
embedding each piece of the encrypted message content into a corresponding image tag with a unique message identifier, a message part identifier, and a web address, wherein the unique message identifier identifies the message to which that piece of the encrypted message content belongs, wherein the message part identifier identifies that piece of the encrypted message content, and wherein the web address is associated with a web server at the decryption service.

13. The method defined in claim 1 further comprising:
at the sender, placing the encrypted message content into a plurality of image tags; and
at the sender, sending the plurality of image tags to the recipient in the message, wherein:
receiving the message at the recipient comprises receiving the plurality of image tags in the message; and
uploading to the remote decryption service comprises automatically uploading the plurality of image tags in the message to the decryption service with a web browser engine.

14. The method defined in claim 1 wherein the encrypted message content is placed into a plurality of image tags at the sender and wherein each image tag includes a web address of a web server at the decryption service, wherein receiving the message at the recipient comprises receiving the plurality of image tags in the message, and wherein uploading to the remote decryption service comprises automatically uploading the plurality of image tags in the message to the web server at the decryption service with a web browser engine.

15. The method defined in claim 1 wherein the encrypted message content is placed into a plurality of GIF image tags at the sender and wherein each GIF image tag includes a web address of a web server at the decryption service, wherein receiving the message at the recipient comprises receiving the plurality of image tags in the message, and wherein uploading to the remote decryption service comprises automatically uploading the plurality of GIF image tags in the message to the web server at the decryption service with a web browser engine by sending a plurality of associated GIF image requests to the web server.

16. The method defined in claim 1 further comprising:
at the decryption service, authenticating the recipient before decrypting the encrypted message content.

17. A method for providing recipients with access to message content comprising:
encrypting message content at a sender to produce encrypted message content;
breaking the encrypted message content into pieces;
sending a message to a recipient over the Internet from the sender that contains the encrypted message content embedded in a plurality of image tags, each of which contains a respective one of the pieces of encrypted message content and each of which contains a message part identifier that identifies that piece;
uploading the plurality of image tags from the recipient to a decryption service over the Internet;
at the decryption service, reconstructing the encrypted message content from the pieces of encrypted message content using the message part identifiers;
at the decryption service, decrypting the encrypted message content to produce the message content for the recipient; and
providing the recipient with access to the message content at the decryption service over the Internet.

18. The method defined in claim 17 wherein the image tags each include a web address for a web server at the decryption service and wherein uploading the plurality of image tags to the web server with a web browser engine.

19. The method defined in claim 17 wherein encrypting the message content at the sender comprises encrypting the message content with an IBE public key.

20. The method defined in claim 17 wherein encrypting the message content at the sender comprises encrypting the message content with an PKE public key.

* * * * *